United States Patent
Maeda et al.

(10) Patent No.: US 7,839,113 B2
(45) Date of Patent: Nov. 23, 2010

(54) APPARATUS AND METHOD FOR DRIVING SYNCHRONOUS MOTOR

(75) Inventors: Daisuke Maeda, Hitachi (JP);
Tsunehiro Endo, Hitachiota (JP);
Hidefumi Shirahama, Hitachi (JP);
Kenji Sakurai, Hitachi (JP); Hiroyuki Hasegawa, Hitachi (JP); Mitsuhiro Mishima, Tokai (JP)

(73) Assignees: Hitachi, Ltd., Tokyo (JP); Hitachi Information & Control Solutions, Ltd., Ibaraki (JP)

( * ) Notice: Subject to any disclaimer, the term of this patent is extended or adjusted under 35 U.S.C. 154(b) by 337 days.

(21) Appl. No.: 12/019,736

(22) Filed: Jan. 25, 2008

(65) Prior Publication Data

US 2008/0203962 A1 Aug. 28, 2008

(30) Foreign Application Priority Data

Feb. 28, 2007 (JP) ............................. 2007-049219

(51) Int. Cl.
*H02P 1/46* (2006.01)
(52) U.S. Cl. .................. 318/721; 318/700; 318/701; 318/716; 318/724
(58) Field of Classification Search .................. 318/700, 318/701, 716–724
See application file for complete search history.

(56) References Cited

U.S. PATENT DOCUMENTS

| | | | | |
|---|---|---|---|---|
| 4,143,311 A | * | 3/1979 | Lee | 318/611 |
| 4,445,076 A | * | 4/1984 | Kobari | 318/690 |
| 5,850,130 A | * | 12/1998 | Fujisaki et al. | 318/400.2 |
| 6,326,760 B1 | * | 12/2001 | Cardoletti et al. | 318/700 |
| 6,359,415 B1 | * | 3/2002 | Suzuki et al. | 318/727 |
| 6,400,107 B1 | * | 6/2002 | Nakatani et al. | 318/400.21 |
| 6,555,988 B2 | * | 4/2003 | Masaki et al. | 318/721 |
| 6,850,027 B2 | * | 2/2005 | Kuwano et al. | 318/685 |
| 7,157,876 B2 | * | 1/2007 | Ide et al. | 318/400.04 |
| 7,224,133 B2 | * | 5/2007 | Nakatsugawa et al. | 318/400.01 |
| 7,276,876 B2 | * | 10/2007 | Kaneko et al. | 318/716 |

FOREIGN PATENT DOCUMENTS

JP 2006-034086 2/2006

* cited by examiner

*Primary Examiner*—Rita Leykin
(74) *Attorney, Agent, or Firm*—Antonelli, Terry, Stout & Kraus, LLP.

(57) ABSTRACT

The synchronous motor driving apparatus including position sensors provided in the synchronous motor, a current polarity detection circuit for detecting the polarities of the currents in the respective phase windings of the synchronous motor, an inverter driving the synchronous motor, a motor speed calculation unit calculating the rotational speed of the synchronous motor depending on the output signals from the position sensors, a speed control unit outputting a first voltage adjusting component (q-axis current command value Iq*) to cause the rotational speed of the synchronous motor to approach a speed command value and a phase control unit outputting a second voltage adjusting component (d-axis current command value Id*) to cause the phase differences between the phases of the position sensor signals and of the currents in the respective phase windings of the synchronous motor to become a predetermined value.

23 Claims, 19 Drawing Sheets

| CURRENT POLARITY SIGNAL \ POSITION STATUS | 0 | 1 | 2 | 3 | 4 | 5 |
|---|---|---|---|---|---|---|
| H | −1 | +1 | +1 | +1 | −1 | −1 |
| L | +1 | −1 | −1 | −1 | +1 | +1 |

FIG. 12

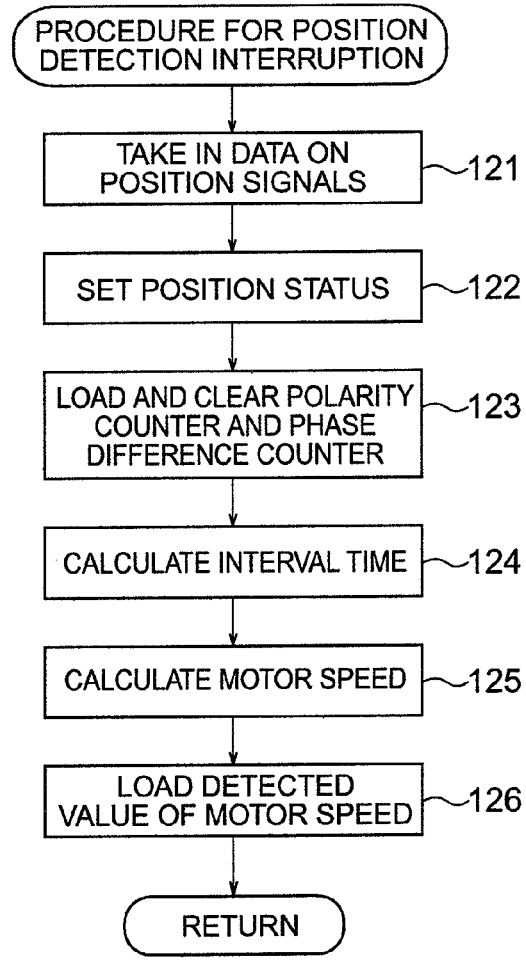

FIG. 13

| POSITION STATUS | POLARITY COUNTER | PHASE DIFFERENCE COUNTER |
|---|---|---|
| 0 | POLARITY COUNTER STORAGE AREA 0 | PHASE COUNTER STORAGE AREA 0 |
| 1 | POLARITY COUNTER STORAGE AREA 1 | PHASE COUNTER STORAGE AREA 1 |
| 2 | POLARITY COUNTER STORAGE AREA 2 | PHASE COUNTER STORAGE AREA 2 |
| 3 | POLARITY COUNTER STORAGE AREA 3 | PHASE COUNTER STORAGE AREA 3 |
| 4 | POLARITY COUNTER STORAGE AREA 4 | PHASE COUNTER STORAGE AREA 4 |
| 5 | POLARITY COUNTER STORAGE AREA 5 | PHASE COUNTER STORAGE AREA 5 |

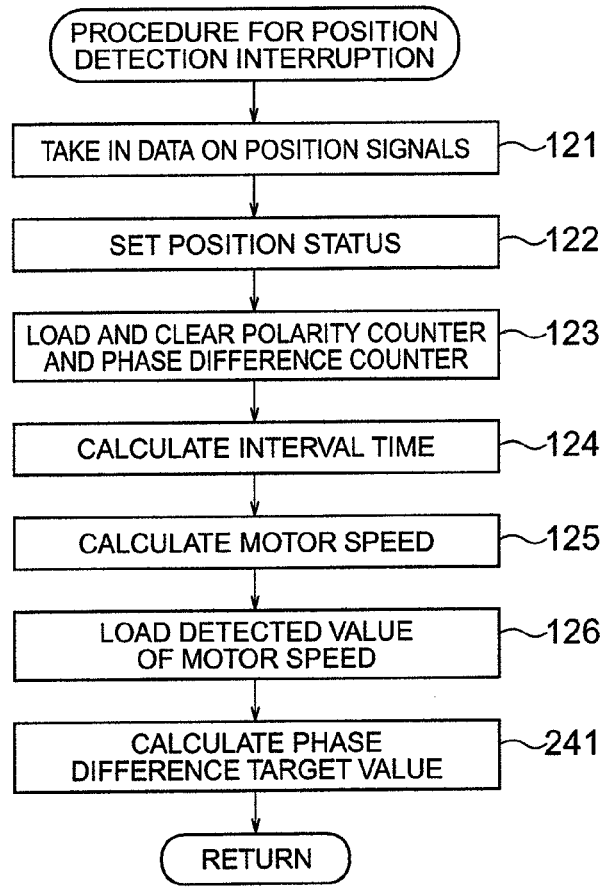
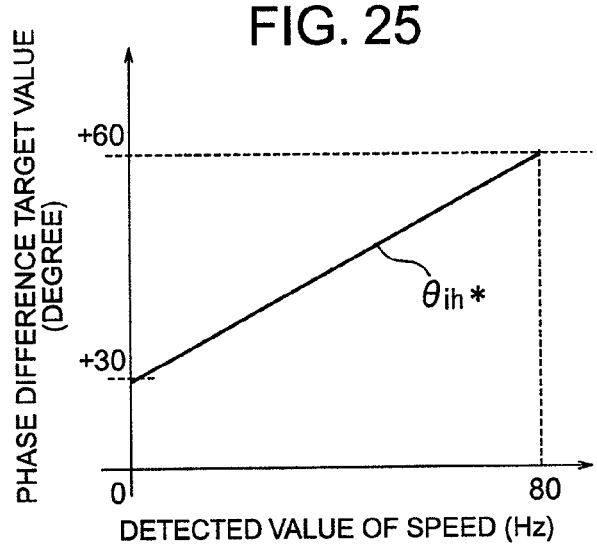

APPARATUS AND METHOD FOR DRIVING SYNCHRONOUS MOTOR

BACKGROUND OF THE INVENTION

This invention relates to an apparatus and a method for driving a synchronous motor.

Synchronous motors have recently been used as fan motors for use with air conditioners and hot water suppliers, which are well adapted for the control of rotational speeds over a wide range, the economy of consumed electric energy and the suppression of mechanical noise. Also, such synchronous motors have been driven by suitable motor drive apparatuses.

Usually, Hall ICs (integrated circuits) as position sensors having a simple structure and being most inexpensive are incorporated in a synchronous motor. The Hall IC detects the positions of the magnetic poles of the synchronous motor so that the synchronous motor is driven by applying appropriate voltages across its windings accordingly. Further, the polarities of currents flowing though the windings of the synchronous motor are detected. The phase difference obtained from the data on the current polarities and the magnetic pole positions detected by the Hall IC, is controlled to achieve high efficiency drive.

JP-A-2006-34086 discloses a conventional drive apparatus for a synchronous motor.

Power is fed to the conventional drive apparatus from a DC power source. Current flowing from the DC source into the synchronous motor is detected, and there is generated a current signal corresponding to the peak value of the detected current. The difference signal obtained by subtracting the current signal from the externally inputted torque command signal (command signal for current value) is outputted. The position sensors deliver the position sensor signals having a constant phase relationship with respect to the voltages induced across the plural phase windings on the stator of the motor. The sinusoidal signals are generated whose voltage values change periodically according to the phase relationships. The amplitudes of the sinusoidal signals are determined depending on the above mentioned difference signal.

On the other hand, the phases of the currents flowing through the phase windings on the stator are detected, the phase differences between the position sensor signals and the current phase signals are detected, and the phase of the sinusoidal signal to be generated according to the phase of the position sensor signal is corrected on the basis of the phase difference.

A drive signal is generated by using a well-known PWM control, on the basis of the amplitude and the phase of the thus obtained sinusoidal signal, and the switching elements of the inverter are driven by supplying the sinusoidal signals to the gate drive circuit.

Namely, according to the synchronous motor drive apparatus disclosed in JP-A-2006-34086, the amplitudes of the voltages applied across the stator windings are determined in accordance with the difference between the current signal corresponding to the peak value of the current flowing from the power source into the motor and the externally inputted torque command signal. Then, the motor is driven by determining the phases of the voltages applied across the stator windings on the basis of the phase differences between the position sensor signals and the phase currents.

SUMMARY OF THE INVENTION

The synchronous motor drive apparatus disclosed in JP-A-2006-34086 determines the amplitudes of the voltages applied across the stator windings by using the data on the current flowing from the power source into the motor and on the torque command. However, although the torque command is proportional in principle to phase current, it does not change depending solely on the current from the power source, as apparent from the expression shown in Table 3-6, page 43, Chapter 3 of "Easy Way to Technology on Small Motors", published by Ohm-sha.

Accordingly, if the amplitudes of the voltages supplied to the motor are calculated from the data on the currents from the power source and on the torque commands, such voltages are not optimal so that the motor speed fluctuates, which leads to the generation of mechanical noise.

In addition, the conventional synchronous motor drive apparatus must be provided with a circuit for detecting the data on the currents from the power source and therefore cannot enjoy a simple structure and a low cost.

Moreover, since, in the case of a salient pole machine, not only magnetic torque but also reluctance torque is generated, the optimal phase for maximum efficiency does not occur when the phases of the induced phase voltages of the three-phase power coincide respectively with the phases of the corresponding phase currents of the three-phase power. Accordingly, the maximum efficiency cannot be attained. Further, since the magnitude of the reluctance torque depends on the motor parameters (e.g. resistances and inductances of windings, and back EMF constant), reduction in efficiency is incurred. (EMF: electromotive force)

One object of this invention is to provide an apparatus and a method for driving a synchronous motor which can be operated with low mechanical noise and high efficiency.

Another object of this invention is to provide an apparatus and a method for driving a synchronous motor which is built inexpensively, does not depend on the motor parameters, and can be used in a wide variety of applications.

According to one aspect of this invention, there is disclosed a synchronous motor drive apparatus comprising a three-phase inverter for supplying three-phase AC power, the voltage and frequency of which are variable, for a synchronous motor; position sensors for outputting the position sensor signals related to the voltages induced in the windings of the synchronous motor; a current phase detection unit for detecting the phases of the currents flowing through the respective phase windings of the synchronous motor; a speed control unit for calculating the rotational speed of the synchronous motor and outputting a first voltage adjusting component to cause the rotational speed to approach a speed command value; a phase control unit for outputting a second voltage adjusting component to cause the phase differences between the phases of the position sensor signals and the phases of the currents flowing through the respective phase windings of the synchronous motor to approach a phase difference target value; and a voltage determination unit for determining the amplitudes and the phases of the output voltages of the three-phase inverter depending on the first and second voltage adjusting components, wherein the three-phase inverter is so controlled as to deliver the output voltages whose amplitudes and phases are determined by the voltage determination unit.

According to an embodiment of this invention, the first voltage adjusting component is the q-axis current command value and the second voltage adjusting component is the d-axis current command value.

According to another aspect of this invention, there is disclosed a synchronous motor drive apparatus comprising a first semiconductor device incorporating therein a speed control unit for outputting a first voltage adjusting component to cause the rotational speed of a synchronous motor to approach a speed command value, a phase difference calculation unit for calculating the phase difference between the phase of the position sensor signal and the phase of the current flowing through the respective phase winding of the synchronous motor, a phase control unit for outputting a second voltage adjusting component to cause the phase difference between the phase of the position sensor signal and the phase of the current flowing through the respective phase winding of the synchronous motor to approach a phase difference target value, a voltage determination unit for determining the amplitudes and phases of the output voltages of the three-phase inverter depending respectively on the first and second voltage adjusting components, and a drive signal generation unit for generating drive signals to control the switching element so as to cause the three-phase inverter to deliver the output voltages whose amplitudes and phases are determined by the voltage determination unit; and a second semiconductor device incorporating therein the above mentioned three-phase inverter, a gate drive circuit for driving the switching elements of the three-phase inverter depending on the drive signals, and a current phase detection unit.

According to still another aspect of this invention, there is disclosed a method for driving a synchronous motor, comprising a speed control step of outputting a first voltage adjusting component to cause the rotational speed of a synchronous motor to approach a speed command value, a phase control step of outputting a second voltage adjusting component to cause the phase differences between the phases of the position sensor signals and the phases of the currents flowing through the respective phase windings of the synchronous motor to approach a phase difference target value, and a voltage determination step of determining the amplitudes and phases of the output voltages of the three-phase inverter depending respectively on the first and second voltage adjusting components, wherein the three-phase inverter is so controlled as to deliver the output voltages whose amplitudes and phases are determined by the voltage determination unit.

According to another embodiment of this invention, an apparatus or a method for driving a synchronous motor can be realized which can be operated with high efficiency and low mechanical noise, by maintaining the phase difference between each phase current and the corresponding magnetic position sensor signal at a preset value and by so controlling the rotational speed of the synchronous motor as to approach the motor speed command value.

According to still another embodiment of this invention, an apparatus or a method for driving a synchronous motor can be realized which is of inexpensive structure, has a universal applicability without dependence on the motor characteristic and is operable with high efficiency, by making variable the target value for the phase difference between each phase current and the corresponding magnetic position sensor signal.

Other objects, features and advantages of the invention will become apparent from the following description of the embodiments of the invention taken in conjunction with the accompanying drawings.

BRIEF DESCRIPTION OF THE DRAWINGS

FIG. 12 is a flow chart for the interruption procedure for position detection performed in the first embodiment of this invention;

FIG. 13 shows a table for illustrating the storage areas of the polarity counter and the phase difference counter used in the first embodiment of this invention;

FIG. 24 is a flow chart for the interruption procedure for position detection performed in the second embodiment of this invention;

FIG. 25 is an example of the graphic representation of the characteristic illustrating the relationship between the phase difference target value and the value of the detected speed, observed in the second embodiment of this invention;

DESCRIPTION OF THE EMBODIMENTS

Embodiments of this invention will now be described in detail with reference to the attached drawings.

In the following embodiments, description is made under the assumption that the first and second voltage adjusting components are represented as the q- and d-axis current command values Iq* and Id*, respectively.

Embodiment 1

Figure 1:
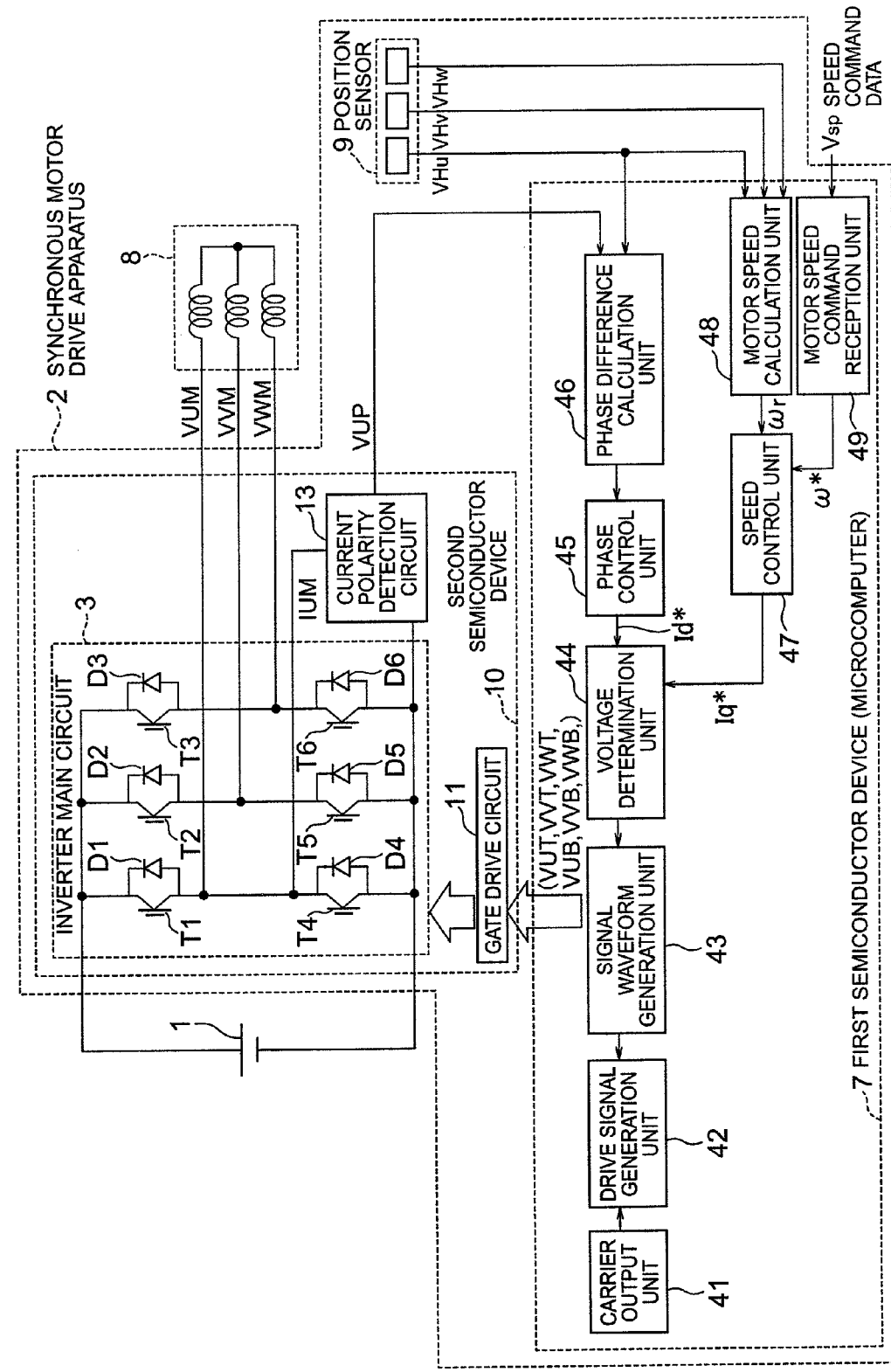
FIG. 1 shows in general block diagram an apparatus for driving a synchronous motor as a first embodiment of this invention.

FIG. 1 shows in general block diagram an apparatus for driving a synchronous motor as a first embodiment of this invention. This synchronous motor drive apparatus 2 can be suitably applied as a drive apparatus for a fan motor used in, for example, the outdoor unit of an air conditioner.

(Description of Drive Apparatus as a Whole)

The main circuit in FIG. 1 will first be described. A DC power source 1 supplies DC power to a synchronous motor drive apparatus 2. The voltage of the DC power is a high voltage of about 141~450 volts and fed from a battery or a converter available in the market which is used to commutate and smooth the commercial AC power.

An inverter main circuit 3 consists of six switching elements T1~T6. The switching elements T1 and T4 are connected in series with each other, the switching elements T2 and T5 are connected in series with each other, and the switching elements T3 and T6 are connected in series with each other. The three series circuits of the switching elements, corresponding to three phases, are connected between the positive and negative terminals of the DC source 1. The junctions between the switching elements T1 and T4, between the switching elements T2 and T5, and between the switching elements T3 and T6 are used as the terminals for three phase AC power output. The switching elements T1~T6 are provided with backflow diodes connected in inverse parallel configuration. This inverter main circuit 3 generates a three phase AC power having variable voltage and variable frequency on the basis of the power supplied from the DC power source and the gate drive signal supplied from a gate drive circuit 11, and the three phase AC power is supplied to the windings 8 of a synchronous motor.

The control system of this apparatus is then described. A first semiconductor device is preferably a microcomputer, which inputs an external speed command data Vsp and outputs a drive signal to the gate drive circuit 11 in a second semiconductor apparatus 10.

A motor speed command reception unit 49 receives the speed command data Vsp and outputs a speed command value ω* to a speed control unit 47.

The synchronous motor is provided with position sensors 9 which output the position sensor signals VHu~VHw that have predetermined phase relationships with respect to the voltages induced in the respective phase windings 8 of the synchronous motor. The position sensor signals VHu~VHw are then supplied to a motor speed calculation unit 48 in the first semiconductor device 7, the position sensor signal VHu being supplied also to a phase difference calculation unit 46 in the first semiconductor device 7. The motor speed calculation unit 48 sends out a value ωr representing the detected motor speed to a speed control unit 47. The speed control unit 47 obtains the difference Δω between the speed command value ω* and the value ωr of the detected speed, performs required calculations, and outputs the q-axis current command value Iq* to a voltage determination unit 44.

On the other hand, a current polarity detection circuit 13, which serves as a current phase detecting means to detect the phases of the phase currents in the synchronous motor, is provided in the second semiconductor device 10. The current polarity detection circuit 13 outputs a U-phase current polarity signal VUP to the phase difference calculation unit 46 in the first semiconductor device 7. The phase difference calculation unit 46 inputs the position sensor signal, for example, VHu from the position sensor 9 and the phase current polarity signal VUP from the current polarity detection circuit 13 and calculates the phase difference between the voltages induced for the respective phases in the motor and the corresponding phase currents. A phase control unit 45 obtains the difference Δθih between the phase difference target value θih* and the detected value θih of phase difference, performs required calculations, and outputs the d-axis current command value Id* to a voltage determination unit 44.

The voltage determination unit 44, which constitutes the principal part of this invention, determines the amplitudes and phases of the voltages applied to the phase windings of the synchronous motor on the basis of the first and second voltage adjusting components. How these components are determined will be described later.

A signal waveform generation unit 43 outputs three-phase sinusoidal voltage command values Vu, Vv and Vw in accordance with the voltage (amplitude) command value V1 and the phase θv (n) of the voltage, both calculated by the voltage determination unit 44. A carrier output unit 41 generates carrier waves to give rise to a PWM signal. A drive signal generation unit 42 compares the voltage command values for respective phases with the carrier waves with respect to their amplitudes and outputs to the gate drive circuit 11 a drive signal for driving the inverter.

The foregoing is related to the general structure of the drive circuit for the synchronous motor as the first embodiment of this invention.

The features of this invention will now be described in detail as follows.

(Description of Current Polarity Detection Circuit (Part I))

In this embodiment as described above, the current polarity detection circuit 13 is provided as a means for detecting the phase of current; detects the current flowing through or the voltage developed across, the winding 8 for a specific phase in the synchronous motor; and discerns the polarity of the current for the phase.

Figure 2:
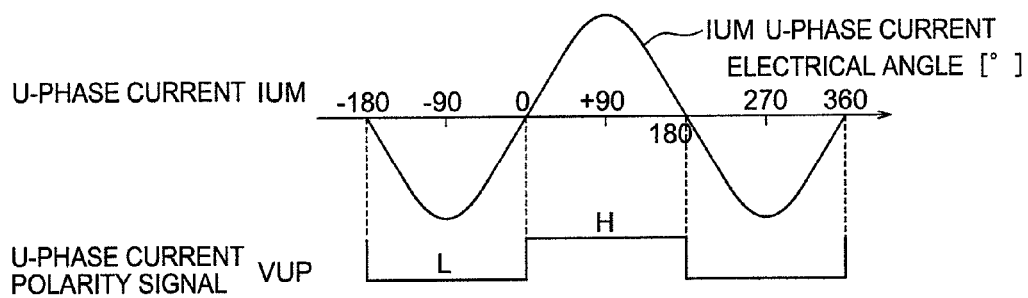
FIG. 2 shows waveforms used to describe the function of a current polarity detecting circuit included in the first embodiment of this invention.

FIG. 2 shows waveforms used to describe the function of the current polarity detecting circuit 13 used in the first embodiment of this invention. In FIG. 2 are shown, by way of an example, the U-phase current IUM and the U-phase current polarity signal VUP which is the output of the current polarity detecting circuit 13. As shown in FIG. 2, while the U-phase current IUM takes a positive value, the U-phase current polarity signal VUP develops the "H (high) level", whereas while the U-phase current IUM takes a negative value, the U-phase current polarity signal VUP develops the "L (low) level". The U-phase current polarity signal VUP in FIG. 2 is inputted to the phase difference calculation unit 46 in the microcomputer 7. A concrete example of the current polarity detection circuit 13 will be described later.

(Description of Position Sensors 9)

The position sensors 9 outputs to the phase difference calculation unit 46 and the motor speed calculation unit 48 the respective position sensor signals which have a constant phase relationship with respect to the voltages induced in the windings 8 of the synchronous motor. Inexpensive Hall ICs may be used as such position sensors 9. Alternatively, more inexpensive Hall elements can be use instead of Hall ICs. When Hall elements are used, the output voltage of each Hall element is that which is developed between any two terminals. The output voltage of the Hall element is usually very low, that is, lower than 1 volt. Therefore, such a low voltage must be amplified by means of an amplifier. In FIG. 1 are shown three Hall ICs, but two position sensors or even only one position sensor may be used.

Figure 3:
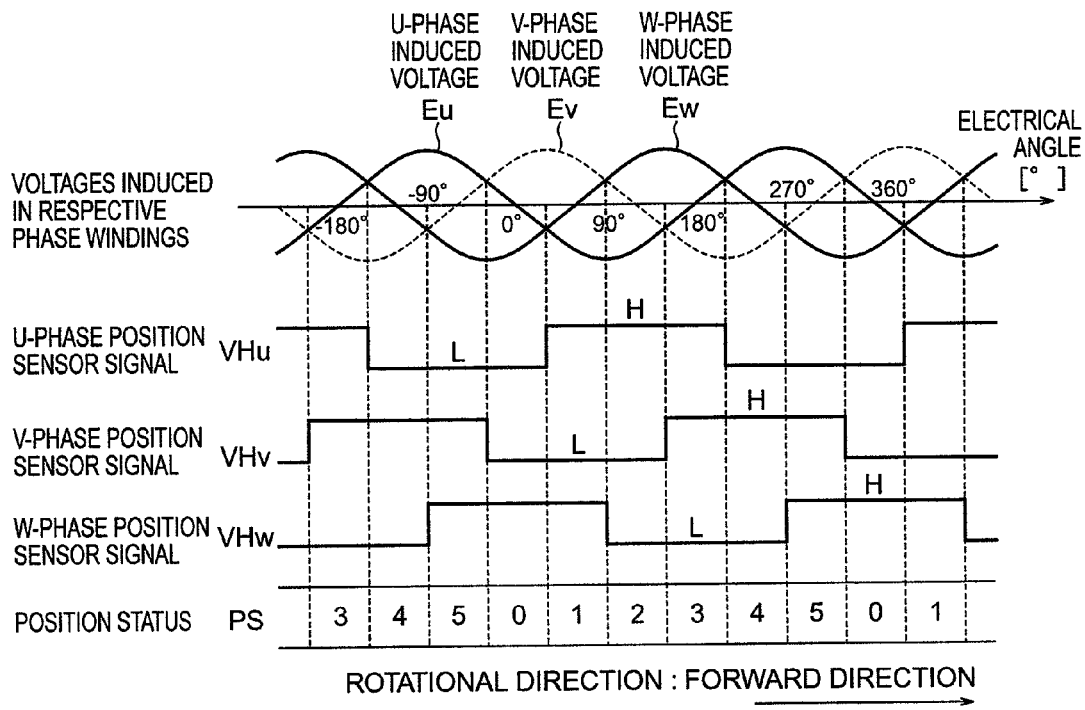
FIG. 3 shows waveforms illustrating the relationship between the signals from the position sensors using Hall ICs and the induced voltages for the respective phases, observed in the first embodiment of this invention.

FIG. 3 shows waveforms illustrating the relationship between the position sensor signals using Hall ICs and the induced voltages for the respective phases, observed in the first embodiment of this invention. As shown in FIG. 3, the position sensors 9 output the U-, V- and W-phase position sensor signals VHu, VHv and VHw which are of negative logic and have 30 degree lag in terms of electrical angle with respect to the U-, V- and W-phase induced voltages Eu, Ev and Ew, respectively. In this embodiment, FIG. 3 is given as an example for showing the relationship among the position sensor signals and the phase induced voltages. It is noted, however, that other relationships can also be equally given. For example, the positive logic and the 30 degree lead in electrical angle may be employed, or an in-phase (with no lag or no lead) relationship or even any phase relationship may be employed.

(Detailed Description of Control Section)

The control section consisting mainly of the first semiconductor device 7 will now be described in detail.

The motor speed command reception unit 49, the motor speed calculation unit 48, the speed control unit 47, the phase difference calculation unit 46, the phase control unit 45, the voltage determination unit 44, the signal waveform generation unit 43, the carrier output unit 41 and the drive signal generation unit 42 form the speed control section, the phase control section and the PWM modulation section.

The speed control section, the phase control section and the PWM modulation section are mounted in the first semiconductor device 7 molded with resin in a single package. On the other hand, the inverter main circuit 3, the gate drive circuit 11 and the current polarity detection circuit 13 are mounted in the second semiconductor device 10 molded with resin in another single package. With this structure, the overall circuit configuration can be simplified and the design of the associated printed circuit board can also be facilitated.

A microcomputer or a digital signal processor (DSP), for example, can serve as the first semiconductor device 7. In this embodiment, the first semiconductor device 7 is assumed to be a microcomputer. The microcomputer inputs the U-, V- and W-phase position sensor signals VHu, VHv and VHw from the position sensors 9, the U-phase current polarity signal VUP from the current polarity detection circuit 13 and the speed command data Vsp, and outputs the drive signal for driving the switching elements of the inverter main circuit 3. A high-voltage-resistant, single-chip inverter IC, for example, can be used as the second semiconductor device 10.

(Speed Control Section)

The motor speed calculation unit 48 measures the time (referred to hereafter as the interval time) (equal to 60 degrees in electrical angle) between the nearest pulse edges of the position sensor signals and calculates the detected speed value ωr. It should here be noted that if two Hall ICs are used, the interval times equal to 60 and 120 degrees in electrical angle will alternate while if only one Hall IC is used, the interval time is equal to 180 degrees in electrical angle. Accordingly, the motor speed detected value ωr may be calculated from the interval times depending on the number of the incorporated Hall ICs.

The motor speed command reception unit 49 receives the speed command data Vsp from outside the microcomputer. The received speed command data Vsp is converted to the speed command value ω* and the speed command value ω* is outputted.

The speed control unit 47 performs its control in such a manner that the speed command value ω* become equal to the detected speed value ωr.

Figure 4:
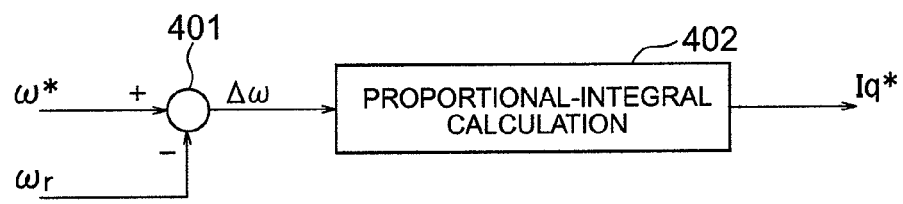
FIG. 4 shows the functional block diagram of a speed control unit used in the first embodiment of this invention.

FIG. 4 shows the functional block diagram of the speed control unit 47 used in the first embodiment of this invention. The difference Δω between the speed command value ω* and the detected speed value ωr is obtained by an adder/subtractor 401. A proportional-integral calculation unit 402 performs the proportional-integral control to output the q-axis current command value Iq*. The proportional-integral control is an example of the speed control, and the proportional control alone or the integral control alone may be employed instead.

Since data essential for the determination of the q-axis current command value Iq* are the position sensor signals VHu~VHw and the speed command data Vsp, the present constitution is free from the influence from the motor parameters.

(Phase Control Section)

The phase difference calculation unit 46 measures the time (referred to as phase difference time) between the pulse edge of the current polarity signal of a specific phase and the pulse edge of the position sensor signal of the corresponding phase. The phase difference detected value θih is obtained from the expression (1) given below by using the time equal to one period in electrical angle of the speed detected value ωr calculated by the motor speed calculation unit 48.

Phase difference detected value θih=(Phase difference time/Time equal to one period in electrical angle)×360°    (1)

Figure 5:
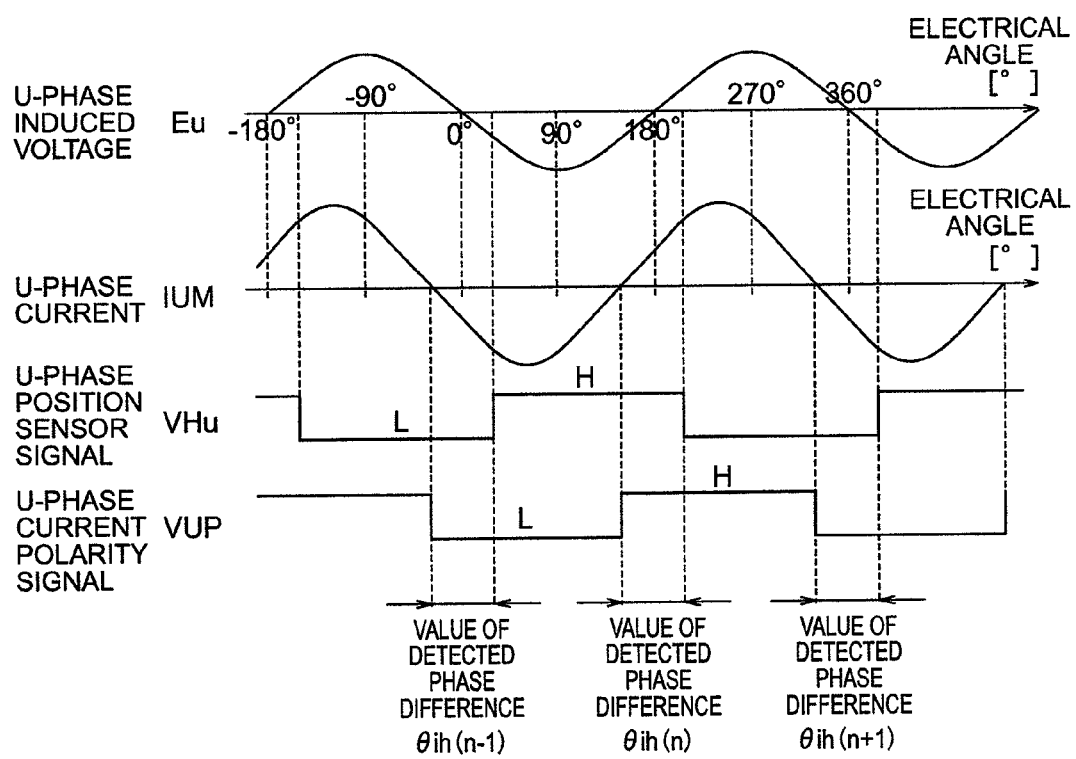
FIG. 5 shows the waveforms of U-phase induced voltage, U-phase current, U-phase position sensor signal and U-phase current polarity signal, observed in the first embodiment of this invention.

FIG. 5 shows the waveforms of the U-phase induced voltage, the U-phase current, the U-phase position sensor signal and the U-phase current polarity signal, observed in the first embodiment of this invention. There is a detected phase difference value θih between the U-phase position sensor signal VHu and the U-phase current polarity signal VUP. In the case shown in FIG. 5, the detected phase difference value θih ranging from the pulse edge of the U-phase current polarity signal VUP taken as reference to the immediately following pulse edge of the U-phase position sensor signal VHu is +60 degrees. The above description is given to various quantities of the U-phase, for example, but it is of course possible to make similar description for the V- or W-phase, or two or three phases.

The phase control unit 45 performs its control in such a manner that the phase difference target value θih* stored in the microcomputer becomes equal to the phase difference detected value θih.

Figure 6:
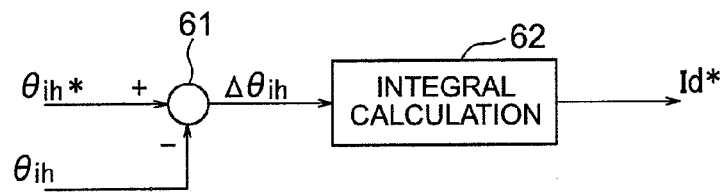
FIG. 6 is the functional block diagram of a phase control unit used in the first embodiment of this invention.

FIG. 6 is the functional block diagram of a phase control unit used in the first embodiment of this invention. As shown in FIG. 6, an adder/subtractor 61 obtains the difference Δθih between the phase difference target value θih* and the phase difference detected value θih, and an integral controller 62 performs integral control and outputs the d-axis current command value Id*. The integral control employed here is an example of phase control, and the proportional control or the proportional-integral control may be substituted for the integral control.

Since data essential for the determination of the d-axis current command value Id* are the current polarity signals, the position sensor signals and the phase difference target value θih*, the present constitution is free from the influence from the motor parameters.

In the case where the synchronous motor under investigation is of non-salient-pole type, since only magnetic torque component is generated without any reluctance torque component at all, the maximum efficiency occurs when the U-phase current IUM and the U-phase induced voltage Eu coincide in phase with each other. In this embodiment, the phase difference detected value θih is +30 degrees from the pulse edge of the U-phase current polarity signal VUP taken as reference to the immediately following pulse edge of the U-phase position sensor signal VHu. Namely, by setting the phase difference target value θih* of +30 degrees in the memory of the microcomputer, the phase control process outputs the d-axis current command value Id* so that the phase difference detected value θih of +60 degrees in FIG. 5 may be changed to +30 degrees.

Figure 7:
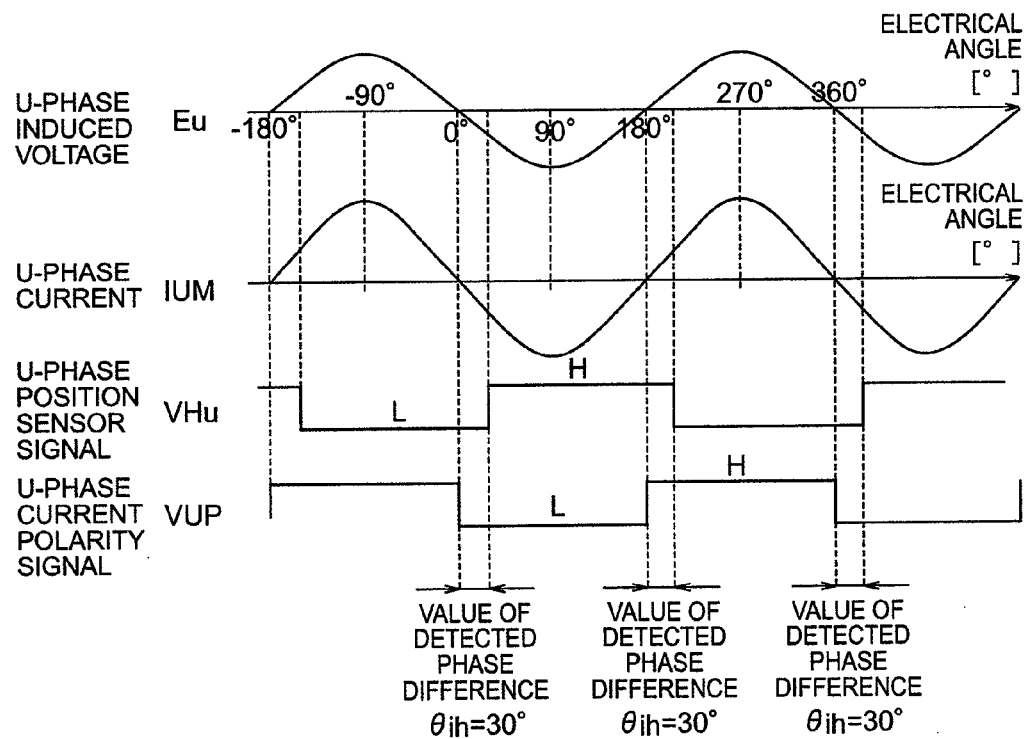
FIG. 7 shows the waveforms of U-phase induced voltage, U-phase current, U-phase position sensor signal and U-phase current polarity signal, observed in the first embodiment of this invention when the phase difference target value is +30 degrees in electrical angle.

FIG. 7 shows the waveforms of U-phase induced voltage, U-phase current, U-phase position sensor signal and U-phase current polarity signal, observed in the first embodiment of this invention when the phase difference target value is +30 degrees in electrical angle. The d-axis current command value Id* is outputted so as to result in the state shown in FIG. 7, that is, to cause the phase difference detected value θih to be equal to +30 degrees.

(Determination of Amplitudes and Phases of Induced Voltages)

The voltage determination unit 44 determines the amplitudes and phases of the voltages applied to the phase windings 8 of the synchronous motor by using the q-axis current command value Iq* and the d-axis current command value Id*. In order to obtain the amplitudes of the voltages, the q-axis voltage command value Vq* and the d-axis voltage command value Vd* are calculated according to the model formulae given by the following expressions (2) and (3).

$$Vd^* = r \cdot Id^* - \omega r \cdot L \cdot Iq^* \quad (2)$$

$$Vq^* = r \cdot Iq^* + \omega r \cdot L \cdot Id^* + \omega r \cdot Ke \quad (3)$$

In the expressions (2) and (3), Vd* represents the d-axis voltage command value, Id* the d-axis current command value, Vq* the q-axis voltage command value, Iq* the q-axis current command value, r the resistance of the winding, L the inductance of the winding, Ke the back EMF constant, and ωr the detected value of motor speed.

The amplitude of voltage is then obtained by using the following expression (4).

$$V1 = \sqrt{(Vd^*)^2 + (Vq^*)^2} \quad (4)$$

Here, V1 represents the application voltage command value.

In this embodiment, the detected motor speed ωr is used in the expressions (2) and (3), but it is possible to substitute the speed command value ω* for the detected motor speed ωr.

Thus, as described above, the speed control unit 47 and the phase control unit 45 determine the d-axis current command value Id* and the q-axis current command value Iq* without being influenced by the motor parameters. Accordingly, since the resistance r of the winding, the inductance L of the winding, the back EMF constant Ke in the expressions (2) and (3) need not have values adapted for the characteristics of the synchronous motor, the speed control unit 47 can generate a motor speed nearly equal to the speed command value ω* and the phase control unit 45 enables the synchronous motor to be operated with high efficiency.

The phase of voltage can be obtained by using the following expressions (5) and (6).

$$\theta v(n) = \delta + \pi/2 \quad (5)$$

$$\delta = \tan^{-1}(-Vd^*/Vq^*) \quad (6)$$

The signal waveform generation unit 43 outputs the U-, V- and W-phase application voltage command values Vu, Vv and Vw separated by phase difference of 120 degrees in electrical angle from one another, on the basis of the application voltage command value V1 and the voltage phase θv(n) calculated by the voltage determination unit 44. The phase of the application voltage is renewed in accordance with the following expression (7) every time the PWM interruption operation takes place. Consequently, the phases of the voltages applied to the windings 8 of the synchronous motor can be continuously renewed. The phase renewal operation need not be performed at the PWM interruption period, but the phase renewal period should preferably be shorter.

$$\theta dv(n) = \theta v(n) + \theta d(n) \quad (7)$$

$$\theta d(n) = \theta d(n-1) + \omega r \cdot \Delta t \quad (8)$$

Here, Δt represents the phase renewal period which equals half the PWM interruption period since in this embodiment the phase renewal tales place every time the PWM interruption operation is performed.

(Generation of PWM Signal)

The carrier output unit 41 outputs a carrier wave for generating a PWM signal. The drive signal generation unit 42 compares the U-, V- and W-phase application voltage command values Vu, Vv and Vw with the amplitude level of the carrier wave, thereby delivering a drive signal for driving the inverter.

(Description of Software Process Flow)

Of the controls and the procedures performed in the microcomputer, the items essential for the description of the embodiments of this invention will now be explained with the aid of process flow charts.

Figure 8:
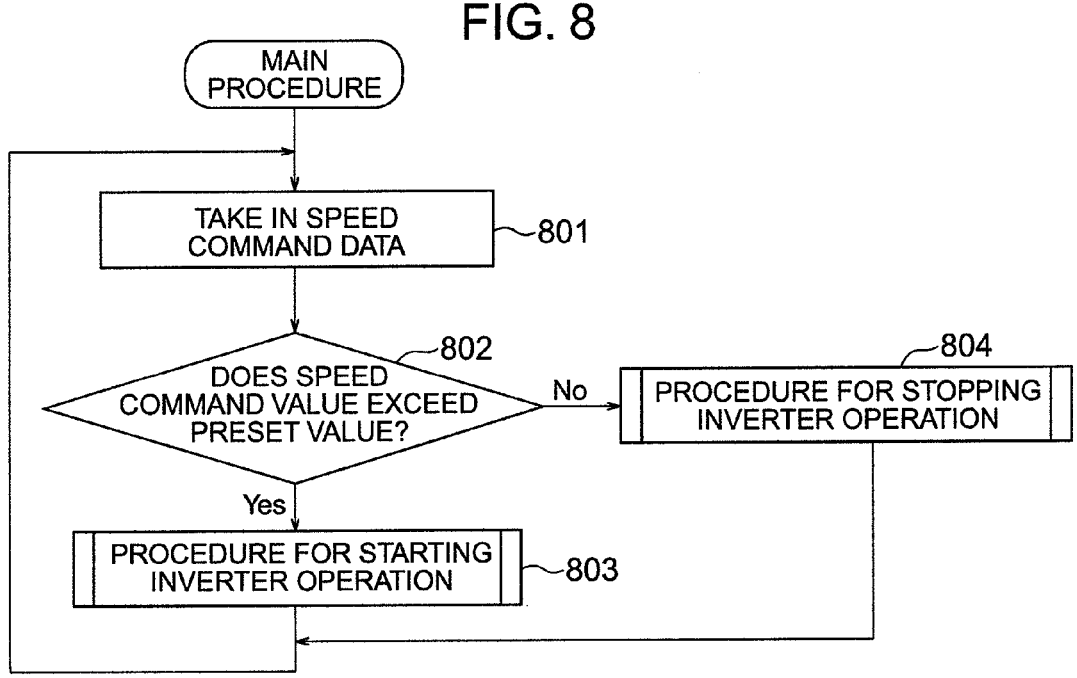
FIG. 8 is a flow chart for the main procedure performed in the first embodiment of this invention.
Figure 9:
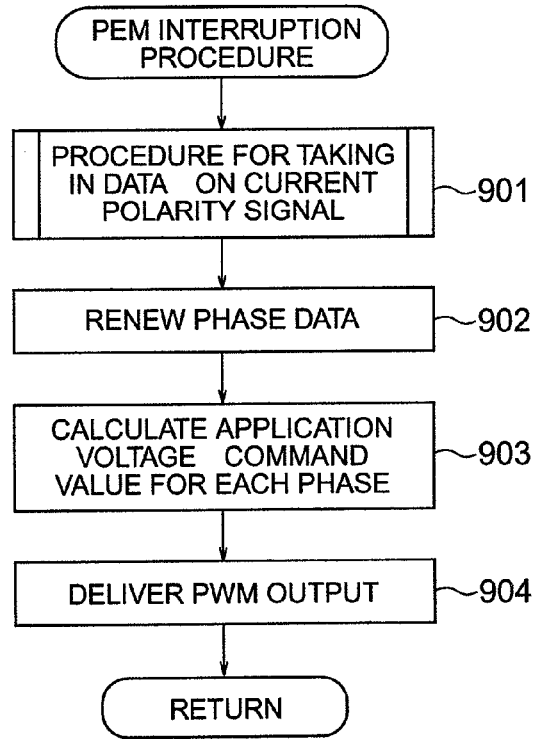
FIG. 9 is a flow chart for the PWM interruption procedure performed in the first embodiment of this invention.
Figure 15:
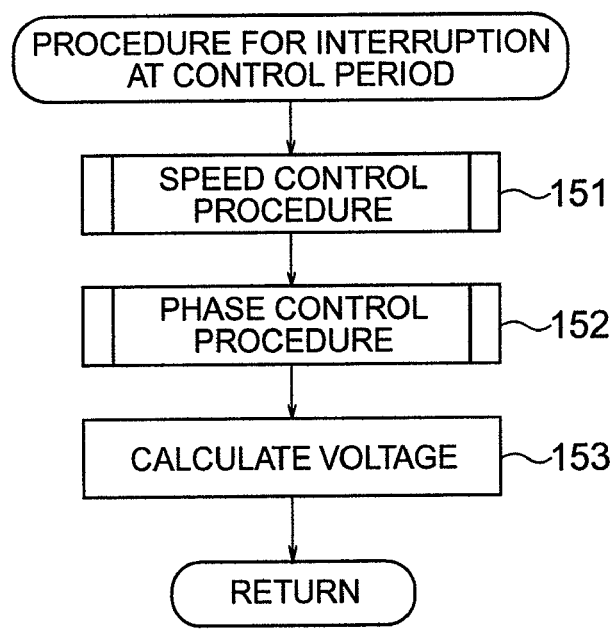
FIG. 15 is a flow chart for the procedure of control period interruption performed in the first embodiment of this invention.

FIG. 8 is a flow chart for the main procedure performed in the first embodiment of this invention. FIG. 9 is a flow chart for the PWM interruption procedure performed in the first embodiment of this invention. FIG. 12 is a flow chart for the interruption procedure for position detection performed in the first embodiment of this invention. FIG. 15 is a flow chart for the procedure of control period interruption performed in the first embodiment of this invention.

The interruption operations other than the main procedure take place whenever they become necessary. For example, the PWM interruption takes place at half the PWM interruption period, the position detection interruption takes place whenever each pulse edge of the position sensor signal is inputted, and the control period interruption takes place whenever the control period timer overflows. The foregoing description is only an example of how an interruption takes place, and therefore any type of interruption may be defined in accordance with the motor characteristic, the load characteristic or the motor speed. Further, three interruptions are described in this embodiment, but the number of such interruptions may be more or less than three.

(Main Procedure)

Description is made below of the main procedure shown in FIG. 8.

The main procedure is as follows: speed command data are read in Step 801; decision is made on the start/stop of the inverter operation in Step 802; when the value of the speed command data Vsp exceeds a preset value, the inverter operation is executed in Step 803; and when the value of the speed command data Vsp is less than the preset value, the inverter operation is not executed in Step 804.

In this process flow, the step of reading the speed command data is included in the software process performed by the motor speed command reception unit 49.

The main procedure usually repeats the above described steps, that is, forms an infinite loop. When the value of the speed command data Vsp proves to exceed the preset value after the former has been read, the peed command data Vsp is stored in the RAM area and the process shifts to the state of inverter operation. The detailed description of the main procedure is omitted.

(PWM Interruption)

The principal procedures according to this invention will now be described with the aid of flowcharts.

FIG. 9 is a flow chart for the PWM interruption procedure performed in the first embodiment of this invention.

This PWM interruption procedure consists of Procedure 901 for reading the data on the current polarity signals, Step 902 of renewing the phase data, Step 903 of calculating the U-, V- and W-phase application voltage command values, and Step 904 of delivering the PWM output. First, Procedure 901 for taking in the data on the current polarity signal is described in detail.

Figures 10, 11:
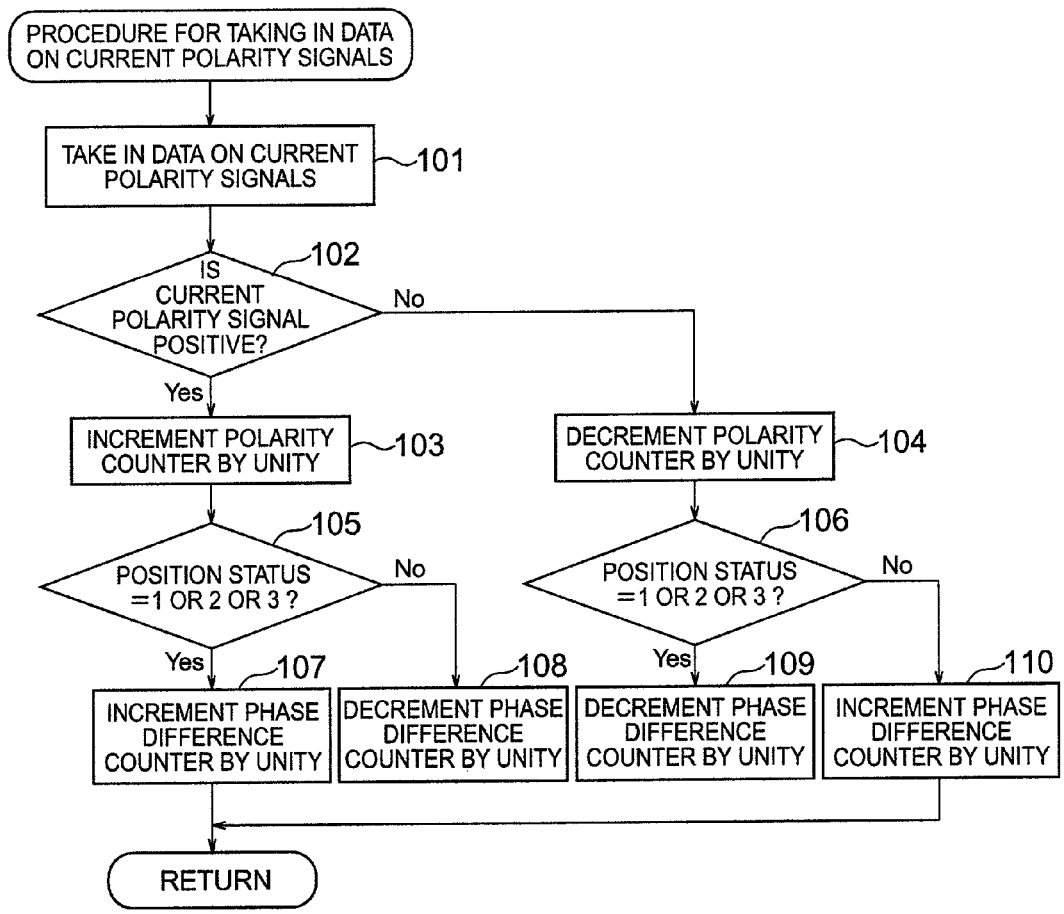
FIG. 10 is a flow chart for the procedure of inputting data on current polarity signals performed in the first embodiment of this invention.
FIG. 11 shows a table for illustrating the operation of the phase difference counter used in the first embodiment of this invention.

FIG. 10 is a flow chart for the interruption procedure for reading the data on current polarity signals, shown in FIG. 9.

The data on the current polarity signals used in the phase difference calculation unit 46 described above is obtained as a result of this procedure for reading the data on current polarity signals.

As shown in FIG. 10, in Step 101 of reading the data on the current polarity signals, the U-phase current polarity signal VUP detected by the current polarity detection circuit 13 at the PWM interruption period is read in; the polarity counter is operated by using this read current polarity signal VUP; and the phase difference counter is operated on the basis of the U-phase current polarity signal VUP and the position status PS (see FIG. 3).

The polarity counter is used to measure the proportions of the positive and negative periods during which the U-phase current polarity signal VUP takes positive and negative values, respectively. The phase difference counter is used to detect the phase difference between the U-phase current polarity signal VUP and the U-phase position sensor signal VHu. According to the decision in Step 102, the polarity counter is incremented in Step 103 when the U-phase current polarity signal VUP takes a positive value, and decremented in Step 104 when the U-phase current polarity signal VUP takes a negative value. Namely, if the positive duration of the U-phase current polarity signal is equal to the negative duration of the same signal, the resultant content of the polarity counters over one period of electrical angle becomes zero.

FIG. 11 shows a table for illustrating the operation of the phase difference counter used in the first embodiment of this invention. As shown in FIG. 11, the phase difference counter is operated depending on the U-phase current polarity signal VUP and the position status PS.

Back to FIG. 9 again, the processes after Step 902 are software processes for the signal waveform generation unit 43 and the drive signal generation unit 42, both described above.

In Step 902 of renewing phase, the application voltage phase is renewed in accordance with the above mentioned expressions (7) and (8). In Step 903 of calculating application voltage command values for respective phases, the U-, V- and W-phase application voltage command values Vu, Vv and Vw separated by 120 degrees in phase from one another are outputted in accordance with the data on the application voltage amplitudes given by the above expression (4) and on the application voltage phases given by the above expression (7). The operation of comparing the respective phase application voltage command values Vu, Vv and Vw with the carrier, performed in Step 904 of outputting PWM, is well-known as described above and therefore the detailed description thereof will be omitted.

(Position Detection)

FIG. 12 is a flow chart for the interruption procedure for position detection performed in the first embodiment of this invention.

This procedure is started as an interruption procedure taking place every time the pulse edge of the position sensor signal is detected. The procedure comprises Step 121 of reading data on the position sensor signals, Step 122 of determining the position status, Step 123 of loading and clearing the polarity and phase difference counters, Step 124 of calculating the interval time, Step 125 of calculating the motor speed, and Step 126 of loading the value of the detected speed into the counter. This procedure is a software procedure performed by the motor speed calculation unit 48.

In Step 121 of reading data on the position sensor signals, the statuses "H" and "L" of the position sensor signals for respective phases are read in. Then, in Step 122, the position statuses PS as shown in FIG. 3 are established in accordance with the read statuses. In Step 123, in accordance with the position statuses PS, the polarity counters and the phase difference counters operated in the PWM interruption procedure shown in FIG. 9 are loaded as shown in FIG. 13, and then after the loading operation the polarity counters and the phase difference counters are cleared to 0 (zero).

FIG. 13 shows a table for illustrating the storage areas of the polarity counter and the phase difference counter used in the first embodiment of this invention. As shown in FIG. 13, there are six storage areas in the polarity counter and sixs storage areas in the phase difference counter, the six storage areas covering 360 degrees in electrical angle. The number, i.e. six, of the storage areas corresponds to the three position sensors used in this embodiment and therefore may be varied if a different number of position sensors are used.

Back to FIG. 12 again, in Step 124 of calculating the interval time, the instant, i.e. time position, of position detection is read and calculated. In this position detection interruption, since the interruption at the pulse edge of the position sensor signal is performed in accordance with the input capture interruption scheme, the instant of starting interruption at the pulse edge of the position sensor signal is automatically secured. Here, the instant is read out of the related register and stored in the dedicated RAM area. In this embodiment, the instant of starting interruption is synchronized with the pulse edge of the position sensor signal, but the interruption may be executed at the variation period of the position sensor signal. For example, the variation of the position sensor signal is monitored at the PWM interruption period so that the position detection interruption can be started the instant such a variation is detected.

The position detection interval, i.e. interval time, is calculated from the presently read instant for position detection and the previously read instant for position detection, and is stored in the dedicated RAM area.

Figure 14:
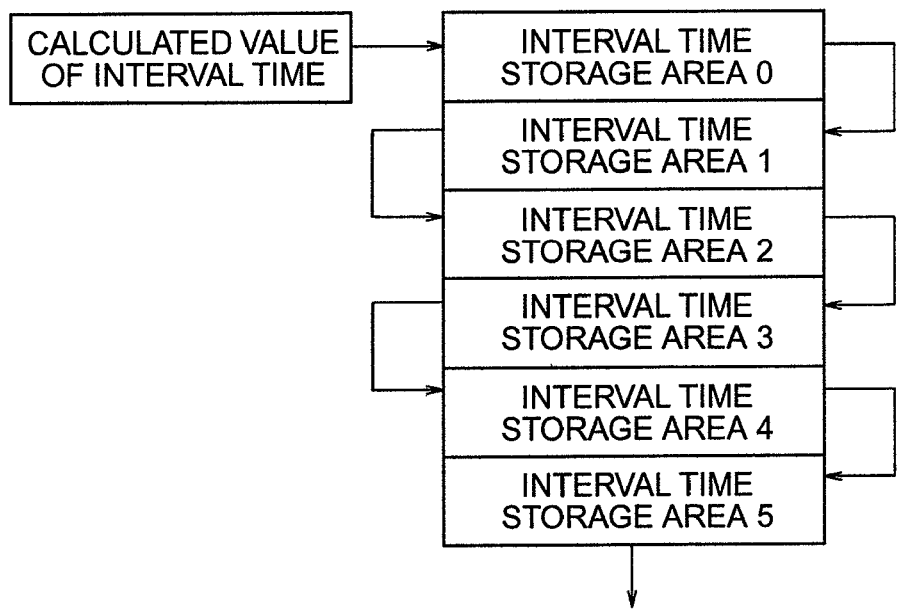
FIG. 14 illustrates the interval time storage areas used in the first embodiment of this invention.

FIG. 14 illustrates the interval time storage areas used in the first embodiment of this invention. As shown in FIG. 14, there are six interval time storage areas (covering 360 degrees in electrical angle), of which the newest interval time covering 60 degrees in electrical angle is stored in the uppermost storage area. In other words, the interval time covering one period in electrical angle can be held and then eliminated in the next period.

In Step 125 of calculating motor speed, the six interval times are averaged and the averaged interval time is converted to a motor speed. If the rotational speed is low or if the load varies to a large extent, then the value ωr of detected speed may be calculated by using an even number of interval times. No matter what method may be used, the spread of position sensor signals can be supressed, and the stable calculation of the value ωr of detected speed is possible.

(Procedure for Control Period Interruption)

FIG. 15 is a flow chart for the procedure of control period interruption performed in the first embodiment of this invention.

This procedure is started as an interruption procedure in tune with the overflow of the control period timer or the position detection interruption procedure.

This procedure, consisting of Procedure 151 for controlling the motor speed, Procedure 152 for phase controlling, and Step of the voltage calculation, is a software process covering the functions of the phase control unit 45, the speed control unit 47 and the voltage determination unit 44.

Figure 16:
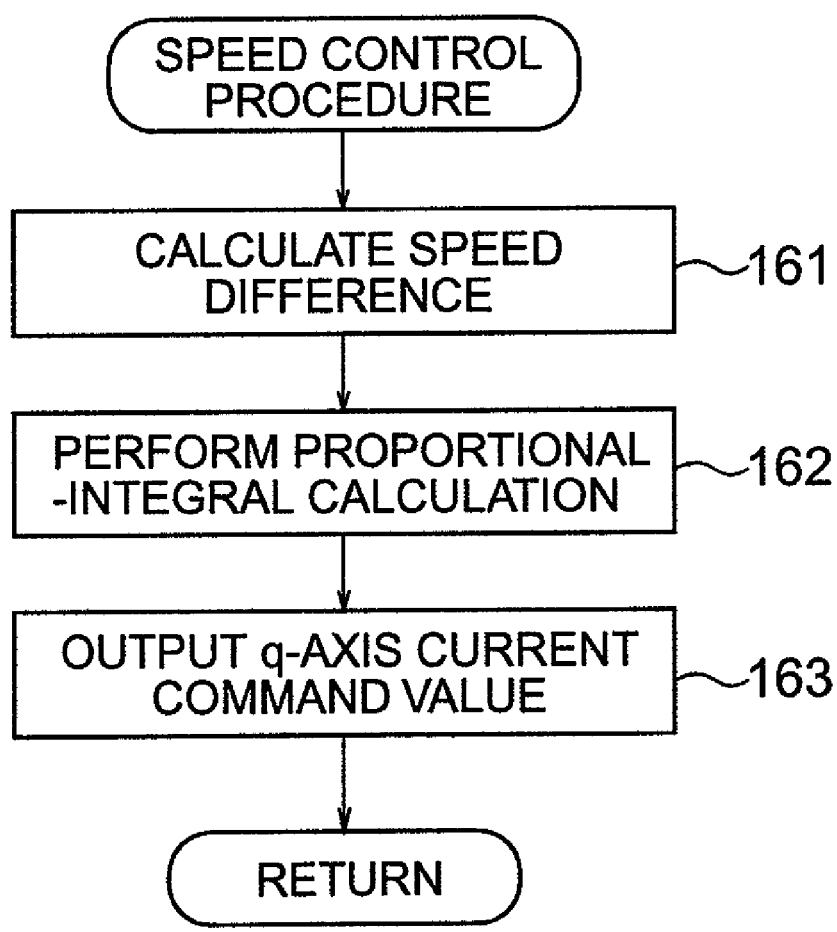
FIG. 16 is a flow chart for the procedure of speed control performed in the first embodiment of this invention.

FIG. 16 is a flow chart for the procedure of speed control performed in the first embodiment of this invention.

In this speed control procedure, the difference Δω between the speed command value ω* and the value ωr of the detected speed is calculated on the basis of the speed command value ω* determined in the main procedure and the value ωr of the detected speed calculated in the position calculation procedure. Then, in Step 162, the difference Δω is inputted to perform the proportional-integral calculation, and the q-axis current command value Iq* is outputted in Step 163.

Figure 17:
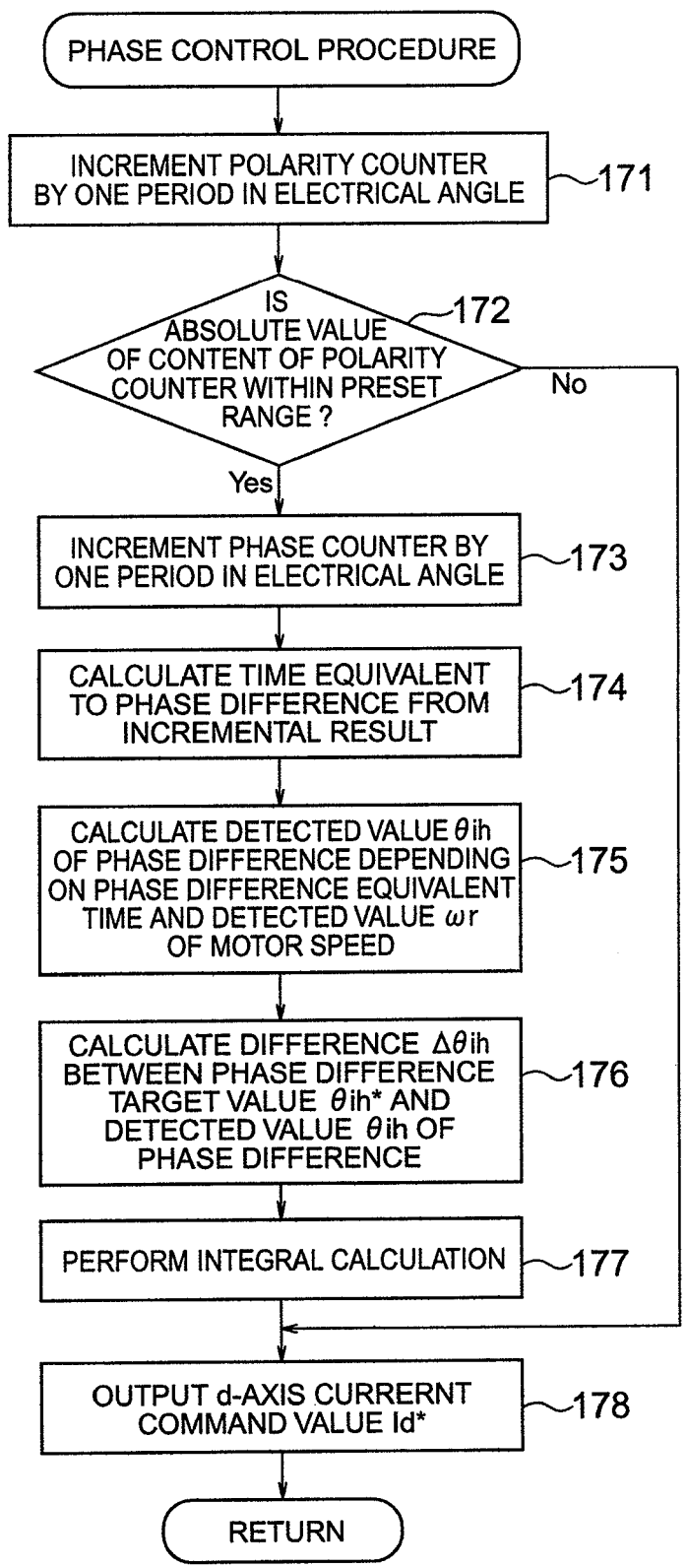
FIG. 17 is a flow chart for the procedure of phase control performed in the first embodiment of this invention.

FIG. 17 is a flow chart for the procedure for phase controlling performed in the first embodiment of this invention.

In the phase control procedure, the values loaded in the polarity counters over one period in electrical angle are added up and then the absolute value is obtained in Step 171. In Step 172, if the absolute value is deemed to be within a preset range (YES branch), the processes represented by Steps 173~178 are performed. Namely, in the range of motor current wherein the current polarity, i.e. positive or negative, per one period in electrical angle can be determined (i.e. in the case of heavy load), the phase control procedure is performed to achieve high efficiency. On the other hand, if the absolute value exceeds the preset range, it is deemed that the motor current is small (i.e. load is light) or that noise is superposed on the current polarity signal so that the right value for the current polarity signal has not been read. As a result, the phase control procedure is not executed (renewed).

As described above, according to this embodiment, the phase control procedure is executed only when the ratio of the positive period to the negative period, of the current polarity signal is within the preset range. On the other hand, the phase control procedure is not renewed when the ratio of the positive period to the negative period, of the current polarity signal is outside the preset range.

As described later with reference to FIG. 18, however, the phase control may be performed in the range where the detected value ωr of the motor speed exceeds the preset value, or the phase control may be continuously performed immediately after the start of the inverter operation. Further, the condition on the ratio of the positive period to the negative period, of the current polarity signal may be combined with the condition on the detected value ωr of the motor speed. In order to prevent the phase control (transfer function) from diverging, it is preferable to decide on the execution or non-execution of the phase control depending on the condition on the ratio of the positive period to the negative period, of the current polarity signal and the condition on the detected value ωr of the motor speed.

In the phase control procedure, the values loaded in the phase difference counters over one period in electrical angle in the interruption procedure for position detection are added up in Step 173, and the phase difference time is calculated by multiplying the added result by the counter renewal period, in Step 174. In this embodiment, the counter renewal period is equal to the PWM interruption period. Further, although the addition is done over one period in electrical angle, the duration of half the period or 60 degrees in electrical angle may also be employed. In consideration of the precision in the current polarity signal and the position sensor signal, the duration should preferably be one or half period in electrical angle.

In Step 175, the detected value θih of the phase difference is calculated through the expression (1) by using the time corresponding to one period in electrical angle derived from the detected value ωr and the phase difference time. In Step 176, the phase difference Δωih between the phase difference target value θih* stored in the memory inside the microcomputer and the detected value θih of the phase difference, is obtained. In Step 177, the phase difference Δωih is inputted and then the integral calculation is performed. In Step 178, the d-axis current command value Id* is outputted. In this embodiment, the phase difference target value θih* and the detected value θih of the phase difference are expressed in electrical angle, but the units of these quantities need not be restricted to electrical angle since if they are of a unit, the same purpose can be attained by modifying the calculation formula in the integral control. For example, if either of the phase difference target value θih* and the detected value θih of the phase difference is expressed in the number of PWM interruptions, the process of converting the unit to electrical angle can be eliminated so that this choice of unit will provide higher efficiency if it is required to shorten the time for performing phase control.

The amplitudes and phases of the voltage command values representing the voltages applied to the windings 8 of the synchronous motor are calculated through the expressions (2)~(6) by using the q-axis current command value Iq* obtained from the speed control procedure and the d-axis current command value Id* obtained from the phase control procedure.

Figure 18:
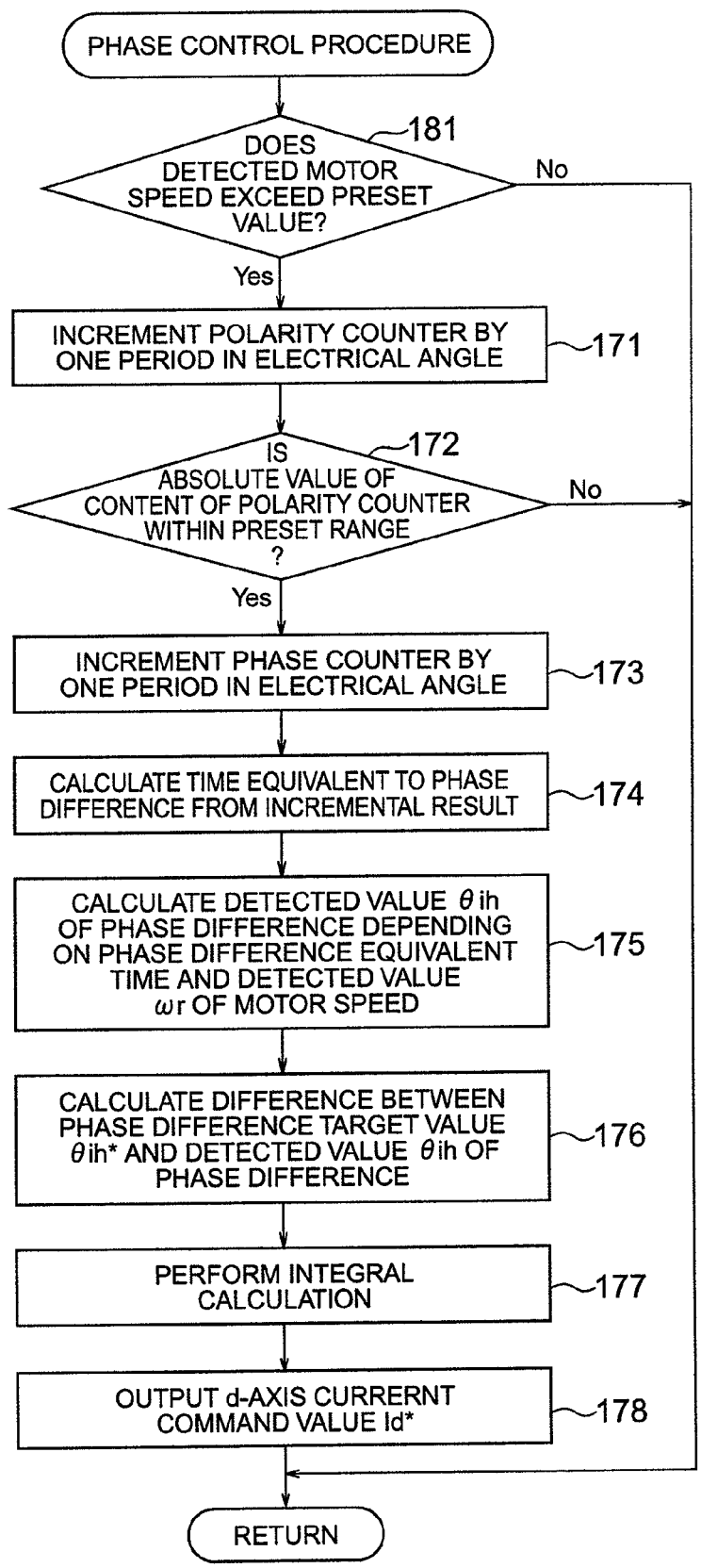
FIG. 18 is a flow chart for the software operation executing the function of the phase control unit 45 used in the first embodiment of this invention.

FIG. 18 is a flow chart for the software operation executing the function of the phase control unit 45 used in the first embodiment of this invention.

This flow chart differs from that shown in FIG. 17 in that there is Step 181 of deciding on the execution or non-execution of phase control (YES or NO branching) depending on the detected value ωr of the motor speed obtained in the position detection interruption procedure shown in FIG. 12. The rest is the same as the flow chart shown in FIG. 17.

In this phase control procedure, the phase control is performed only when the detected value ωr of the motor speed exceeds a preset value.

On the other hand, if the detected value ωr is not greater than the preset value, for example, not greater than 10% of the maximum frequency, the d-axis current command value is not renewed and remains to be the old value. The preset value should preferably be chosen to be in the speed range where the positive and negative durations of the current polarity signal become approximately equal to each other in the practical application.

As described above, according to this embodiment, the phase control procedure is performed when the detected value ωr of the motor speed exceeds a preset value, so that it is possible to prevent the phase control procedure from taking place in time of motor rotating at lower speed where erroneous data are apt to be superposed on the current polarity signal. Consequently, the divergence of the control system due to the phase control on the basis of erroneous data can be prevented so that the region of stable motor drive can be expanded.

(First Example of Current Polarity Detection Circuit)

The current polarity detection circuit 13 shown in FIG. 1 will now be described in detail.

Figure 19:
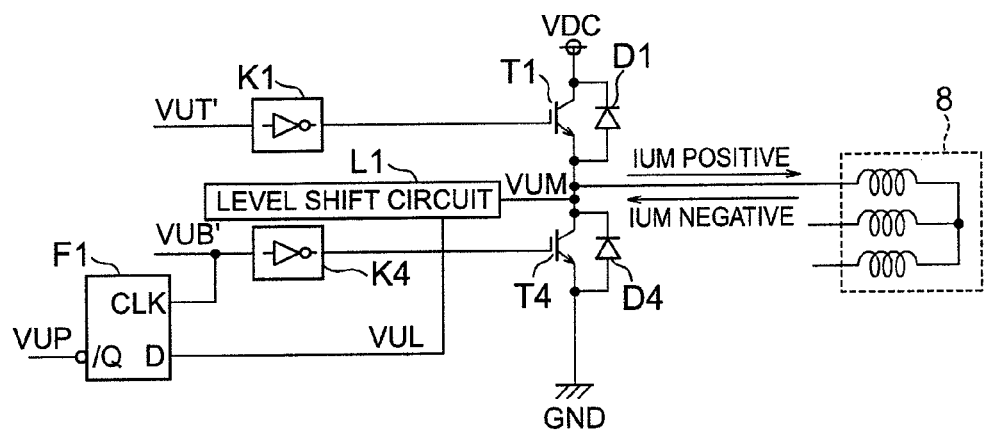
FIG. 19 shows a first concrete example of the current polarity detection circuit used in the first embodiment of this invention.

FIG. 19 shows a first concrete example of the current polarity detection circuit used in the first embodiment of this invention. In FIG. 19, the current polarity detection circuit 13 is shown as detecting the U-phase current polarity.

As shown in FIG. 19, the inverter main circuit 3 includes the U-phase upper arm switching element T1, the U-phase lower arm switching element T4, the U-phase upper arm drive circuit K1 and the U-phase lower arm drive circuit K4. The U-phase part of the motor windings 8 is connected with the junction point of the U-phase upper arm switching element T1 and the U-phase lower arm switching element T4. The U-phase upper arm backflow diode D1 is connected with the U-phase upper arm switching element T1 in the inverse parallel configuration. The U-phase lower arm backflow diode D4 is connected with the U-phase lower arm switching element T4 in the inverse parallel configuration.

This current polarity detection circuit 13 further includes a level shift circuit L1 and a latch circuit F1. The level shift circuit L1 converts the U-phase output voltage VUM to a lower voltage and outputs the lower voltage. Actually, when the U-phase output voltage VUM is approximately equal to the voltage VDC of the high voltage source, the level shift circuit L1 outputs a signal having a certain voltage level, which is referred to hereafter as the "H" signal. When the U-phase output voltage VUM is approximately equal to zero, the level shift circuit L1 outputs a voltage signal having zero level, which is referred to hereafter as the "L" signal. The voltage level of the "H" signal may be at any level that the latch circuit F1 can detect. For example, the voltage level of the "H" signal may vary as the voltage VDC of the high voltage source varies, inasmuch as the voltage level of the "H" signal varies within the range where the latch circuit F1 can detect the "H" signal.

Figure 20:
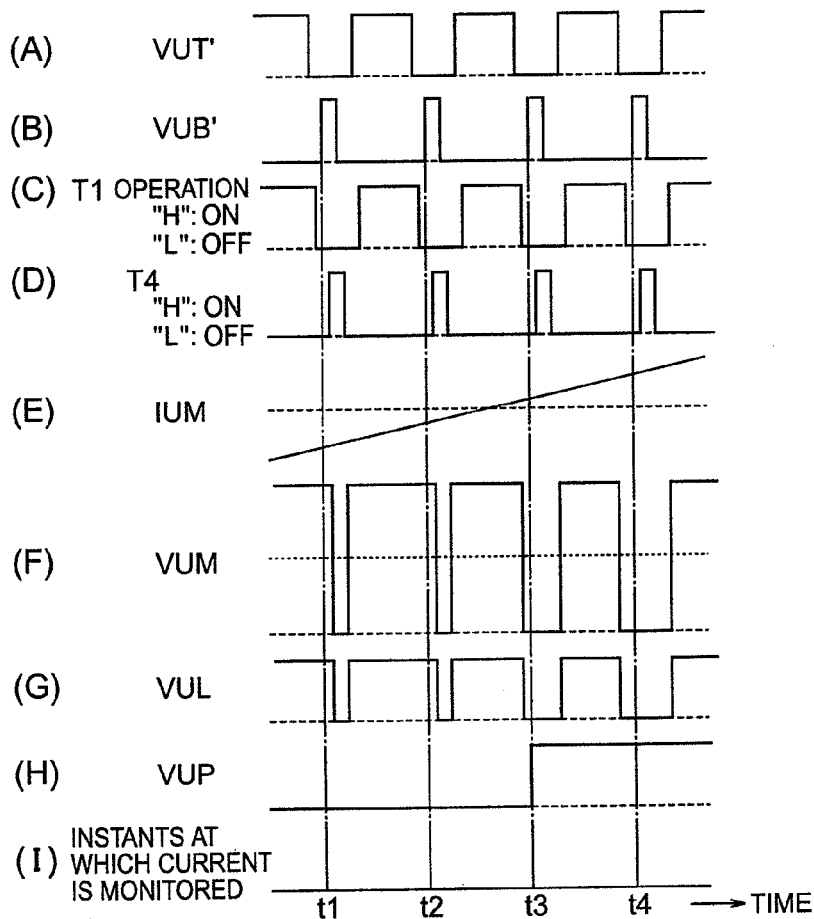
FIG. 20 shows temporal relationship among signal waveforms appearing at various points in the current polarity detection circuit shown in FIG. 19.

FIG. 20 shows temporal relationship among signal waveforms appearing at various points in the current polarity detection circuit 13 shown in FIG. 19. The operation of the current polarity detection circuit 13 shown in FIG. 19 will be described with reference to FIG. 20.

In this embodiment, when neither of the U-phase upper arm switching element T1 and the U-phase lower arm switching element T4 is conducting, the output voltage VUL of the level shift circuit L1 is monitored at instants t1~t4 synchronized with the rise (i.e. leading edge) of the U-phase lower arm control signal VUB'. Accordingly, the U-phase current polarity can be detected.

The latch circuit F1 inverts the output voltage VUL of the level shift circuit L1 at instants t1~t4 synchronized with the rise (i.e. leading edge) of the U-phase lower arm control signal VUB' and outputs the inverted signal as the U-phase current polarity signal VUP. The latch circuit L1 holds the output as it is until the next rise of the U-phase lower arm control signal VUB' is reached.

In FIG. 20, diagram (A) represents the U-phase upper arm control signal VUT', diagram (B) the U-phase lower arm control signal VUB', diagram (C) the operating waveform of the U-phase upper arm switching element T1, and diagram (D) the operating waveform of the U-phase lower arm switching element T4. In diagrams (C) and (D), "H" indicates the conducting (i.e. on) state and "L" denotes the non-conducting (i.e. off) state. Diagram (E) denotes the U-phase current IUM, which is the current flowing from the U-phase output terminal into the U-phase part of the three phase windings 8. The polarity of the U-phase current IUM is defined as positive when it flows into the windings 8 and negative when it flows out of the windings 8. Diagrams (F), (G) and (H) indicates the U-phase output voltage VUM, the output voltage VUL of the level shift circuit L1 and the output voltage of the latch circuit F1, respectively. Diagram (I) shows the instants at which the above mentioned currents are monitored, that is, the latch circuit F1 latches the output voltage VUL of the level shift circuit L1.

In comparison of diagrams (A) and (B) in FIG. 20, it is seen that there is provided intervals (i.e. dead time) where both the U-phase upper arm control signal VUT' and the U-phase lower arm control signal VUB' are non-conducting (i.e. off). These intervals are provided to prevent the upper and lower arm switching elements from turning on simultaneously.

As shown in diagram (I) in FIG. 20, the current monitoring instants are the time points t1~t4 at which the U-phase lower arm control signal VUB' shown in diagram (B) rises from the "L" level to the "H" level. As apparent from the comparison of diagrams (B) and (D), the operation of the U-phase lower arm switching element T4 lags slightly behind the rise of the U-phase lower arm control signal VUB'. Accordingly, at the instant t1 at which the U-phase lower arm control signal VUB' rises from "L" to "H" level, the U-phase upper arm switching element T1 has not yet been turned on as seen in diagram (C) and the U-phase lower arm switching element T4 has not yet been turned on, either, as seen in diagram (D).

When the U-phase current IUM shown in diagram (E) in FIG. 20 has a negative polarity, that is, when the instants t1 and t2 are reached, the current flows from the windings 8 through the U-phase upper arm backflow diode D1 into the motor drive power source. Consequently, the U-phase output voltage VUM becomes approximately equal to the voltage of the high voltage power source as shown in diagram (F).

When the U-phase current IUM shown in diagram (E) in FIG. 20 has a positive polarity, that is, when the instants t3 and t4 are reached, the current flows from the ground GND through the U-phase lower arm backflow diode D4 into the windings 8. Consequently, the U-phase output voltage VUM becomes approximately equal to zero as shown in diagram (F).

The output voltage VUL of the level shift circuit L1 shown in diagram (G) in FIG. 20 is the reduced version of the U-phase output voltage VUM shown in diagram (F), and therefore the waveform of the voltage VUL is similar to the waveform of the voltage VUM except that the amplitude of the former is smaller than that of the latter.

The U-phase current polarity signal VUP shown in diagram (H) in FIG. 20 is the inverted version of the output voltage VUL of the level shift circuit L1, the inversion taking place in synchronism with the rise of the U-phase lower arm control signal VUB' shown in diagram (B).

In the comparison of diagrams (E) and (I) in FIG. 20, it is seen that the U-phase current polarity signal VUP changes from "L" to "H" when the polarity of the U-phase current IUM changes from negative to positive. The instant at which the U-phase current polarity signal VUP turns from "L" to "H" coincides with the instant t3 at which the first rise of the U-phase lower arm control signal VUB' occurs after the instant at which the U-phase current IUM crosses the zero level from negative to positive region.

As shown in FIG. 19, the output voltage VUL of the level shift circuit L1 is directly inputted into the latch circuit F1. However, a circuit configuration having the same function can also be attained by inserting more than one stage of MOS inverter between the latch circuit F1 and the level shift circuit L1. Further, in FIG. 19, the lower arm control signal VUB' is inputted directly into the latch circuit F1. However, a circuit configuration having the same function can also be attained by inserting more than one stage of MOS inverter before the latch circuit F1.

FIGS. 19 and 20 show an example where the U-phase current polarity is detected, but a similar circuit, diagrams and description will hold true for the detection of the other phase currents.

(Second example of Current Polarity Detection Circuit)

Figure 21:
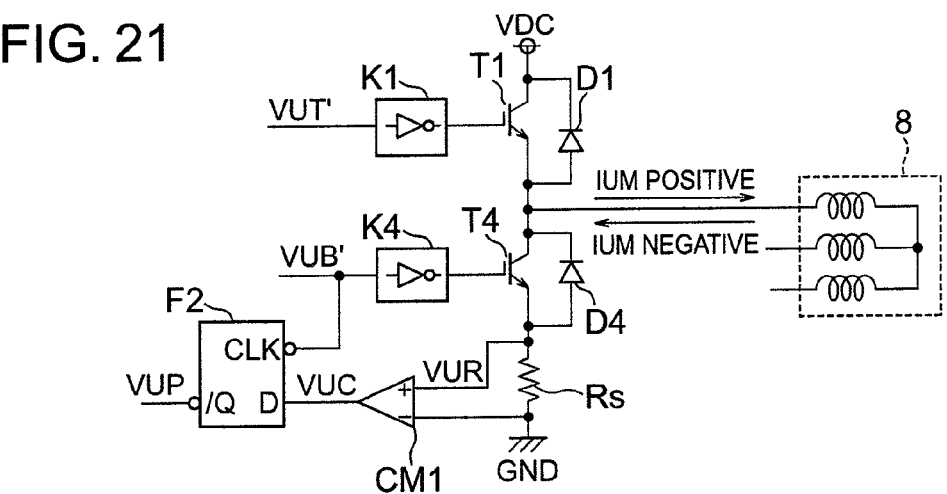
FIG. 21 shows a second concrete example of the current polarity detection circuit used in the first embodiment of this invention.

FIG. 21 shows a second example of the current polarity detection circuit 13. In FIG. 21, the current polarity detection circuit 13 is shown as detecting the U-phase current polarity. The circuit shown in FIG. 21 differs from the circuit shown in FIG. 19 in that a shunt resistor Rs is connected between the U-phase lower arm switching element T4 and the ground potential GND, that a comparator CM1 is added, and that the latch circuit F1 is replaced by a latch circuit F2. The comparator CM1 decides on whether the voltage VUR developed across the shunt resistor Rs is positive or negative. The latch circuit F2 inverts the output voltage VUC of the comparator CM1 at the instants of the falls of the U-phase lower arm control signal VUB' and delivers the inverted signal as the U-phase current polarity signal VUP. The latch circuit F2 holds the old signal until the instant of the next fall of the U-phase lower arm control signal VUB' is reached.

The current polarity detection circuit 13 shown in FIG. 21 detects the polarity of the U-phase current by monitoring the direction of the current flowing through the shunt resistor Rs at the instant of the fall of the U-phase lower arm control signal VUB' while the U-phase upper arm switching element T1 is not conducting (off) and the U-phase lower arm switching element T4 is conducting (on).

Figure 22:
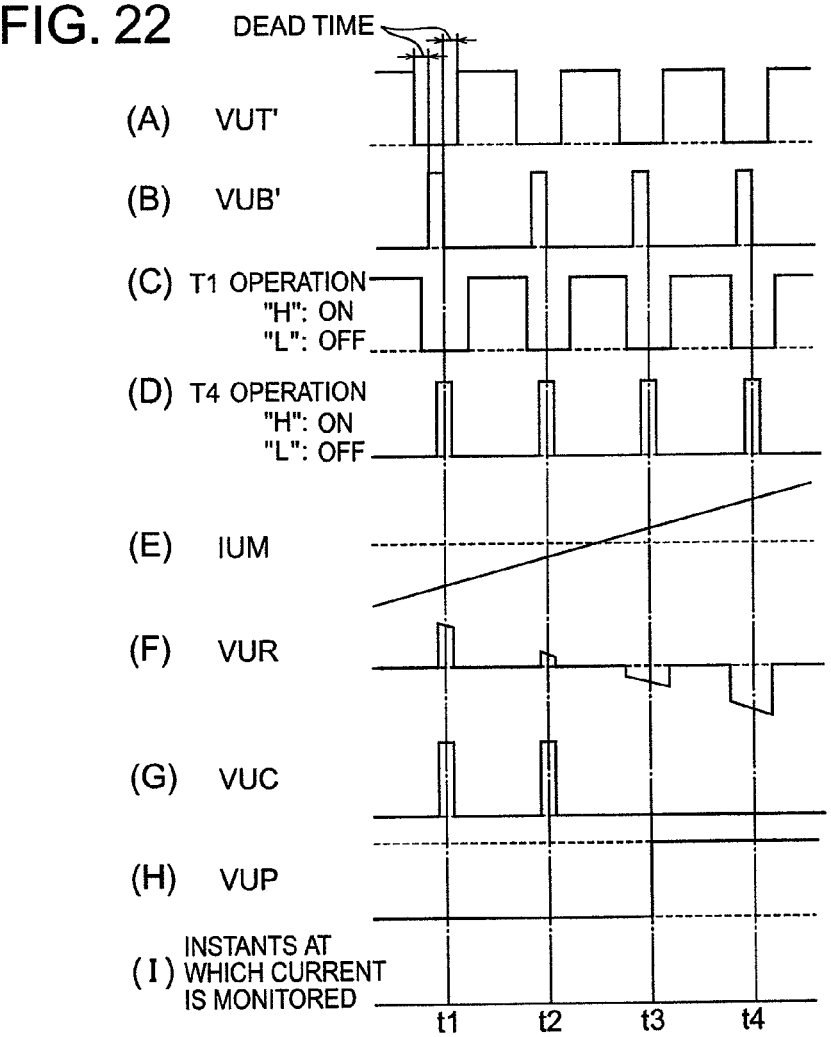
FIG. 22 shows temporal relationship among signal waveforms appearing at various points in the current polarity detection circuit shown in FIG. 21.

FIG. 22 shows temporal relationship among signal waveforms appearing at various points in the current polarity detection circuit 13 shown in FIG. 21. The operation of the current polarity detection circuit 13 shown in FIG. 21 will be described with reference to FIG. 22.

Diagrams (A) through (E), (H) and (I) in FIG. 22 correspond to the diagrams labeled with the same alphabets in FIG. 20. In FIG. 22, diagram (F) denotes the voltage VUR developed across the shunt resistor Rs, and diagram (G) indicates the output voltage VUC of the comparator CM1.

As shown in diagram (I) in FIG. 22, the instants for current monitoring are the time points t1~t4 at which the U-phase lower arm control signal VUB' falls from "H" to "L" level. As apparent from the comparison of diagrams (B) and (D), the operation of the U-phase lower arm switching element T4 lags slightly behind the rise of the U-phase lower arm control signal VUB'. Accordingly, at the instant t1 at which the U-phase lower arm control signal VUB' falls from "H" to "L" level, the U-phase upper arm switching element T1 is not conducting as seen in diagram (C) and the U-phase lower arm switching element T4 is still conducting as seen in diagram (D).

While in diagram (E) in FIG. 22 the polarity of the U-phase current IUM is negative, that is, at instant t1 or t2, the U-phase lower arm switching element T4 is conducting as seen in diagram (D) in FIG. 22 so that the current flows from the U-phase part of the windings 8 through the U-phase lower arm switching element T4 and the shunt resistor Rs to the ground potential GND. Thus, the voltage VUR developed across the shunt resistor Rs becomes positive as seen in diagram (F) in FIG. 22.

While the polarity of the U-phase current IUM in diagram (E) in FIG. 22 is positive, that is, at instant t3 or t4, the U-phase upper arm switching element T1 is not conducting as seen in diagram (C) in FIG. 22. Accordingly, the current flows from the ground potential GND through the shunt resistor Rs and the U-phase lower arm backflow diode D4 to the U-phase part of the windings 8. As a result, the voltage VUR developed across the shunt resistor Rs becomes negative as seen in diagram (F) in FIG. 22.

The output voltage VUC of the comparator CM1 in diagram (G) in FIG. 22 is indicative of the result of decision on whether the voltage VUR across the shunt resistor Rs is positive or negative. If the voltage VUR across the shunt resistor Rs is positive, the comparator output voltage VUC is at the high level, i.e. "H", whereas if the voltage VUR is negative, the voltage VUC is at the low level, i.e. "L".

The U-phase current polarity signal VUP in diagram (H) in FIG. 22 is the inverted version of the output voltage VUC of the comparator CM1, the inversion taking place in synchronism with the instant of the fall of the U-phase lower arm control signal VUB'.

In the comparison of diagrams (E) and (H) in FIG. 22, it is seen that the U-phase current polarity signal VUP turns from "L" to "H" when the polarity of the U-phase current IUM changes from negative to positive. The instant at which the U-phase current polarity signal VUP turns from "L" to "H" coincides with the instant t3 at which the first fall of the U-phase lower arm control signal VUB' occurs after the instant at which the U-phase current IUM crosses the zero level from negative to positive region.

As shown in FIG. 21, the output voltage VUC of the comparator CM1 is directly inputted into the latch circuit F2. However, a circuit configuration having the same function can also be attained by inserting more than one stage of MOS inverter between the latch circuit F2 and the comparator CM1. Further, in FIG. 21, the lower arm control signal VUB' is inputted directly into the latch circuit F2. However, a circuit configuration having the same function can also be attained by inserting more than one stage of MOS inverter before the latch circuit F2. FIGS. 21 and 22 show an example where the U-phase current polarity is detected, but a similar circuit, diagrams and description will hold true for the detection of the other phase currents.

As described above, according to the first embodiment of this invention, since the phase difference between each phase current and the corresponding magnetic position sensor signal is set to a predetermined value and since the rotational speed of the synchronous motor is so controlled as to approach the motor speed command value, then a synchronous motor drive apparatus can be realized which can be operated with high efficiency, low fluctuation in speed, and low mechanical noise.

In addition, according to this embodiment of the present invention, since there is no need for the data on the amplitude of the current flowing into or out of the power source of the inverter main circuit and on the amplitude of the current flowing into or out of the windings 8 of the synchronous motor, but since use is made of the data on the polarity of the current flowing through the windings 8 of the synchronous motor and the data from the position sensors having a low resolving power, a synchronous motor drive apparatus with high efficiency can be built at low cost.

Furthermore, according to this embodiment of the present invention, since the position sensor signal and the current polarity signal, which do not depend on the motor parameters, are detected and since the amplitude and phase of the voltage applied to the windings 8 of the synchronous motor are controlled on the basis of the detected signals, then the resulted synchronous motor drive apparatus can be used to drive a wide variety of synchronous motors without depending on motor parameters.

Embodiment 2

Figure 23:
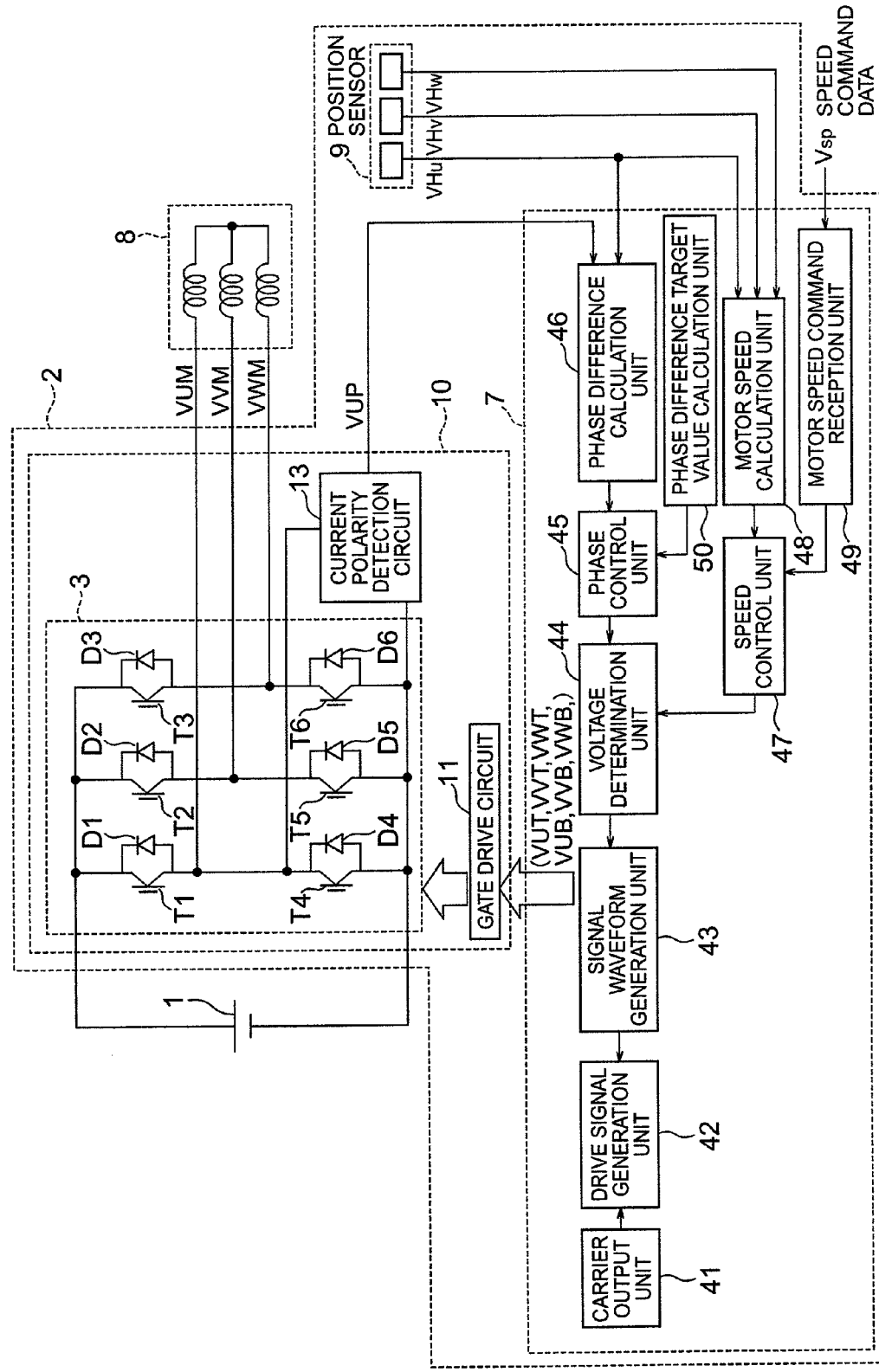
FIG. 23 shows in general block diagram an apparatus for driving a synchronous motor as a second embodiment of this invention.

FIG. 23 shows in general block diagram an apparatus for driving a synchronous motor as a second embodiment of this invention. In FIG. 23, the same components as shown in FIG. 1 are indicated by the same reference numerals. Only different components are described below.

The synchronous motor drive apparatus shown in FIG. 23 differs from that shown in FIG. 1 in the additional provision of a phase difference target value calculation unit 50.

FIG. 24 is a flow chart for the interruption procedure for position detection performed in the second embodiment of this invention. FIG. 24 is the same as FIG. 12 except the addition of Step 241 of calculating phase difference target value.

FIG. 25 is an example of the graphic representation illustrating the relationship between the phase difference target value and the value of the detected speed, observed in the case where the phase difference target value is varied in accordance with the value of the detected speed.

In FIG. 23, the phase difference target value calculation unit 50 calculates and then holds, the phase difference target value θih* in accordance with the detected value ωr of speed obtained by the motor speed calculation unit 48. In the example shown in FIG. 25, the phase difference target value θih* held above while the motor is at halt is set equal to +30 degrees, increased in proportion to the increase in the speed, and set equal to +60 degrees for 80% speed.

The rest of the operations are the same as those described in the first embodiment, and therefore omitted here.

In this second embodiment, as shown in FIG. 25, the phase difference target value is calculated in accordance with the linear expression, but it may be varied stepwise in accordance with the detected value ωr of speed, or calculated by using an approximating formula previously stored in the microcomputer as a result of the prior investigation of the motor characteristic and the load characteristic. Further, the phase difference target value θih* may be calculated in accordance with the speed command value ω*.

Thus, according to the second embodiment of this invention, the phase difference target value θih* indicative of the difference between the current flowing through and the voltage developed across, the respective phase part of the windings 8 of the synchronous motor can be made variable depending on the detected value ωr of motor speed. Hence, the phase difference between the current polarity signal indicative of the polarity of the current flowing though the windings 8 and the position sensor signal can be made variable depending on the motor speed. Consequently, according to this second embodiment, not only the magnetic torque but also the reluctance torque can be used to drive a salient-pole synchronous motor. This assures an operation with high efficiency and a universal application to synchronous motors without having to depend on motor parameters.

Embodiment 3

Figure 26:
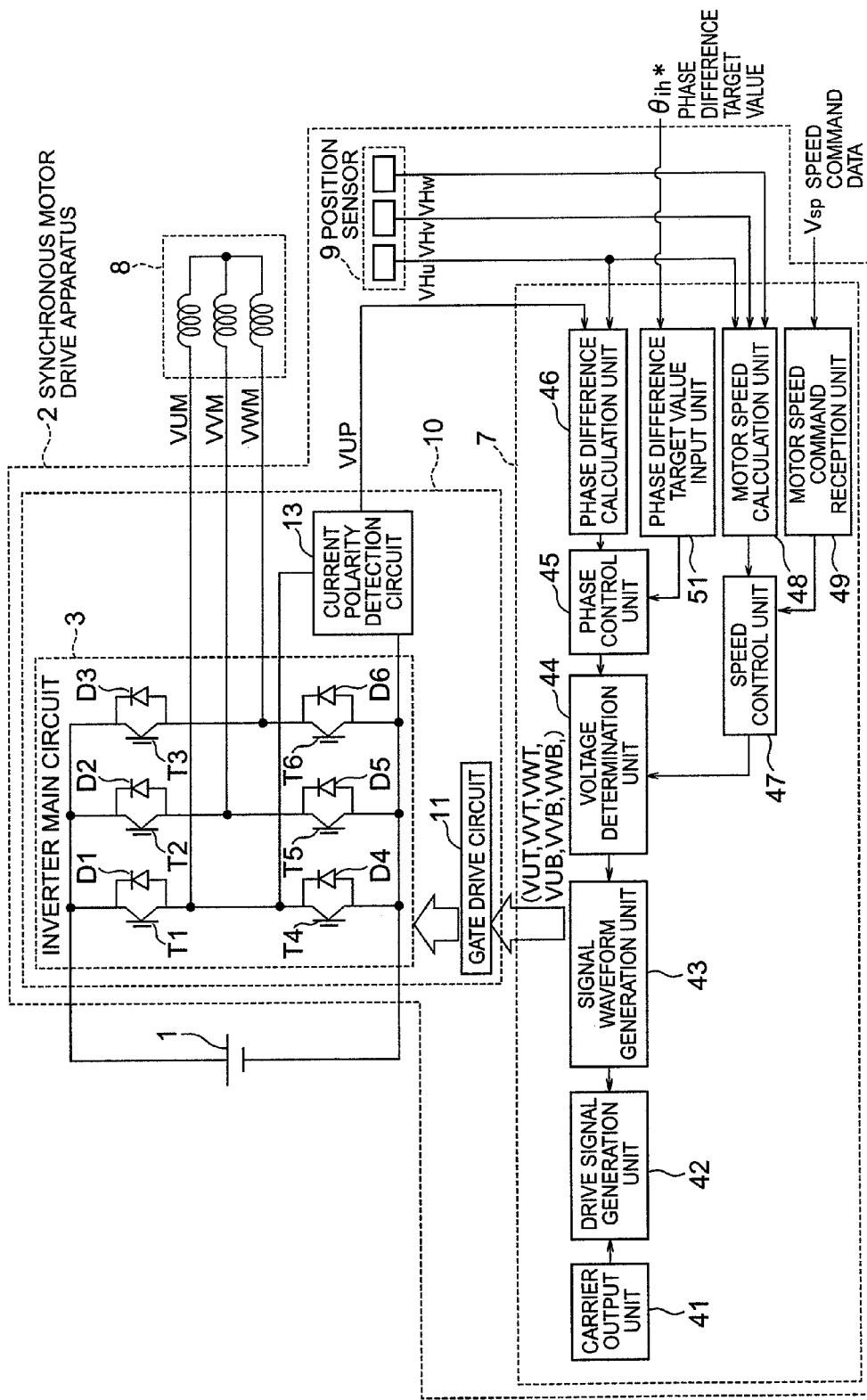
FIG. 26 shows in general block diagram an apparatus for driving a synchronous motor as a third embodiment of this invention.

FIG. 26 shows in general block diagram an apparatus for driving a synchronous motor as a third embodiment of this invention. In FIG. 26, the same components as those shown in FIG. 1 are indicated by the same reference numerals. Only different components are described below.

The synchronous motor drive apparatus shown in FIG. 26 differs from that shown in FIG. 1 in the additional provision of a phase difference target value input unit 51.

The phase difference target value input unit 51 receives and holds the phase difference target value θih* preset outside the microcomputer. The phase difference target value input unit 51, after having held the received phase difference target value, operates in the same manner as described with the first embodiment detailed above, and therefore the operation of the unit 51 is omitted here. Further, the phase difference target value calculation unit 50 for the embodiment 2 may be used with the phase difference target value input unit 51 for the embodiment 3 together.

In case of presetting the phase difference target value θih* outside the microcomputer, a voltage corresponding to the phase difference target value θih* may be obtained through the voltage division by resistors and taken in through the AD port of the microcomputer. Also, the presetting may be made through the combination of "H" and "L" using the I/O port, or through serial communications.

The procedure of receiving the phase difference target value should preferably be performed within a period shorter than that required for the phase control procedure, but may be performed in a later period in the main procedure in consideration of the execution time of microcomputer.

As described above, according to the third embodiment of this invention, by enabling the phase difference target value θih* indicative of the phase difference between the current flowing through and the voltage developed across, the respective phase part of the windings 8 of the synchronous motor, to be set outside the microcomputer, the phase difference between the current and the voltage for each of the U-, V- and W-phases can be arbitrarily varied. Therefore, according to this third embodiment, not only the magnetic torque but also the reluctance torque can be used to drive a salient-pole synchronous motor. This assures an operation with high efficiency and a universal application to synchronous motors without having to depend on motor parameters.

Figure 27:
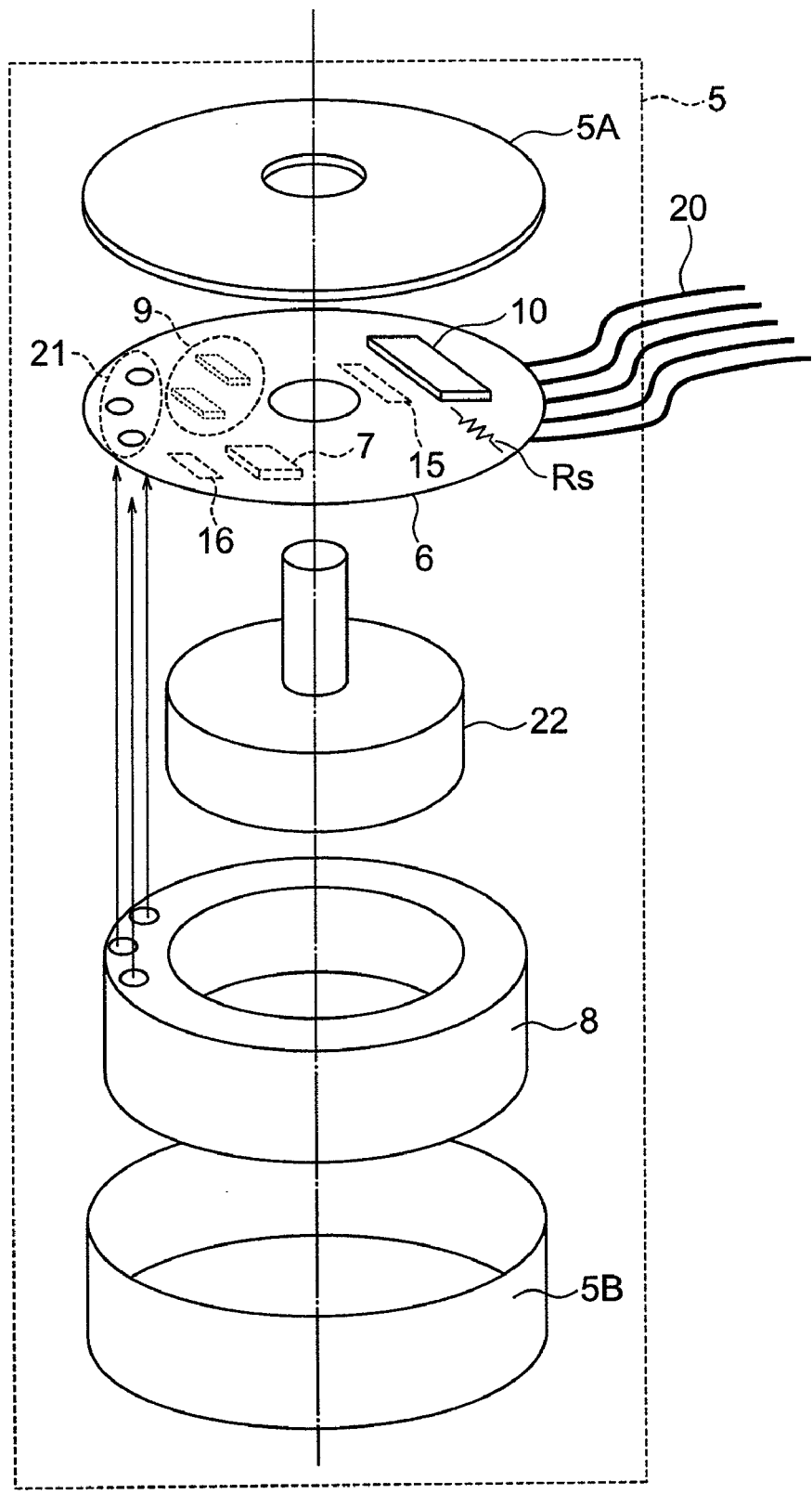
FIG. 27 shows in perspective, exploded view a first example of the synchronous motor to which this invention can be applied.

FIG. 27 shows in perspective, exploded view a first example of the synchronous motor to which this invention can be applied. The motor 5 shown in FIG. 27 has a built-in circuit board 6 on which the first semiconductor device 7, the position sensors 9 and the second semiconductor device 10, all shown in FIG. 1, are mounted. Further, the shunt resistor Rs shown in FIG. 21, and the circuit 15 for detecting the voltage of the high voltage power source and the temperature detecting circuit 16, neither shown in the attached drawings, are also mounted on the built-in circuit board 6.

In the motor 5 according to this embodiment, the windings 8 are set in the lower casing 5B of the motor 5. The permanent magnet rotor 22 is placed in the windings 8 with a suitable gap set between the outer periphery of the rotor 22 and the inner circumference of the windings 8 to keep the rotor 22 from contacting the windings 8. The built-in circuit board 6 is located above the permanent magnet rotor 22. The position sensors 9 are located on that side of the built-in circuit board 6 (lower side in FIG. 27) which faces the permanent magnet rotor 22 so as to facilitate the detection of the positions of the magnetic poles of the rotor 22. For example, the first semiconductor device 7, the circuit 15 for detecting the voltage of the high voltage power source, the temperature detecting circuit 16 and the shunt resistor Rs are located on that side of the built-in circuit board 6 which faces the permanent magnet rotor 22 (lower side in FIG. 27) while the second semiconductor device 10 is located on the side (upper side in FIG. 27) of the built-in circuit board 6 opposite to the side facing the rotor 22.

In the case where the temperature detecting circuit 16 is used to detect the temperature of the first semiconductor device 7, the thermister of the temperature detecting circuit 16 is located near the first semiconductor device 7. The built-in circuit board 6 is provided with winding terminals 21, with which the windings 8 are connected by soldering. Lead wires 20 are coupled to the associated terminals provided on the built-in circuit board 6 by soldering. The lead wires 20 consists of five conductors: VDC conductor, Vcc conductor, Vsp conductor, FG conductor and GND conductor. The uppermost part 5A of the motor casing is disposed like a lid above the built-in circuit board 6. Accordingly, after the motor 5 has been assembled, the built-in circuit board 6 is housed in the motor casing consisting of the upper part 5A and the lower part 5B.

The motor 5 may be modified by dispensing with the lower casing 5B and instead molding the windings 8 with resin or the like.

Figure 28:
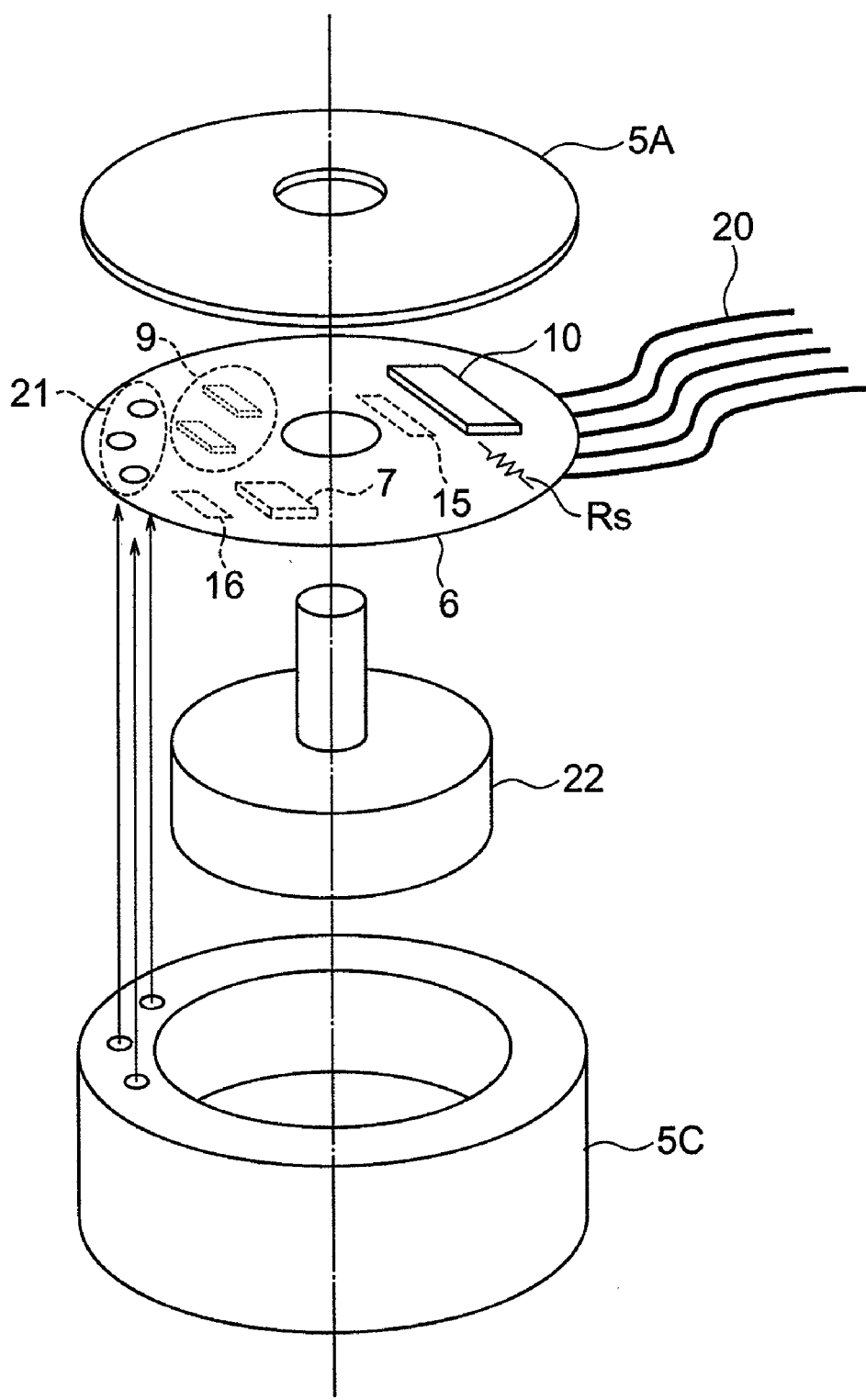
FIG. 28 shows in perspective, exploded view a second example of the synchronous motor to which this invention can be suitably applied.

FIG. 28 shows in perspective, exploded view a second example of the synchronous motor to which this invention can be suitably applied. This example is a variation of the motor 5 shown in FIG. 27 wherein the windings 8 are molded with resin or the like. In FIG. 28, the molded windings are indicated at reference alphanumeric 5C. The remaining parts of the motor 5 are the same as those of the motor 5 shown in FIG. 27.

Another modification may be of such a structure that the upper and lower parts 5A and 5B of the motor casing are dispensed with and that the windings 8 and the built-in circuit board 6 are molded in a single block.

Figure 29:
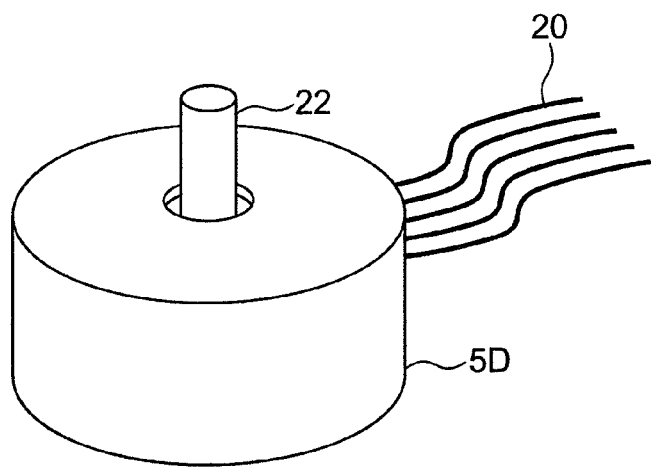
FIG. 29 shows in perspective view an example of another synchronous motor to which this invention can be suitably applied.

FIG. 29 shows in perspective view an example of another synchronous motor to which this invention can be suitably applied, the motor being of such a structure that the windings 8 and the built-in circuit board 6 are molded in a single block. FIG. 29, differing from FIGS. 27 and 28, shows the finished state of the motor. The molded block 5D contains the windings 8 and the built-in circuit board 6. As in FIG. 27, on the built-in circuit board 6 are mounted the first semiconductor device 7, the second semiconductor device 10, the circuit 15 for detecting the voltage of the high voltage power source, the temperature detecting circuit 16, the shunt resistor Rs and the position sensors 9.

According to the last example, the first semiconductor device 7 and the second semiconductor device 10 are contained in a single package so that the number of the constituent parts can be reduced, whereby the pattern design and the layout of the parts can also be facilitated. Consequently, the control circuitry is contained in the motor housing so that a highly reliable motor having a simple structure and a reduced number of parts can be provided at low cost.

Figure 30A:
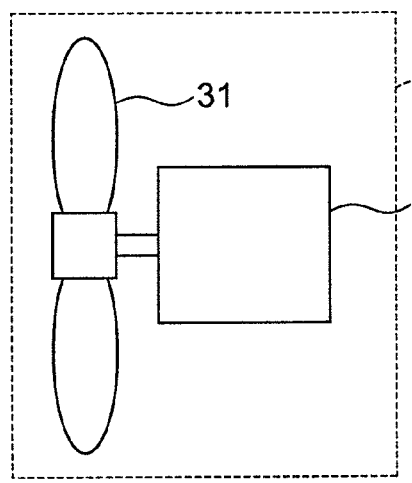
FIGS. 30A and 30B an example in which the synchronous motor shown in FIG. 29 is applied to a air blower.
Figure 30B:
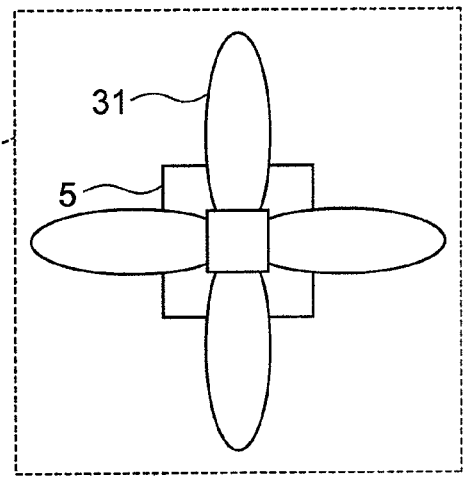

FIGS. 30A and 30B show a case in which the synchronous motor shown in FIG. 29 is applied to an air blower. FIG. 30A shows a side view of the air blower 30, while FIG. 30B shows a front view thereof. The air blower 30 shown in FIGS. 30A and 30B consists mainly of the motor 5 shown above as the last example in FIG. 29 and the air blower fan 31. When the motor 5 is driven, wind is sent to an intended object.

For example, in the case where the conventional motor driving apparatus is used to drive the air blower 30 such as the fan motor of an air conditioner, mechanical noise is generated due to the speed or load fluctuation.

In general, anti-vibration rubber is used as a part of the motor structure to reduce such noise. Anti-vibration rubber is used, for example, at the point where the fan motor is fixed to the outdoor unit, between the permanent magnet as the rotor and the rotor shaft, or between the shaft and the fan.

According to this embodiment, the motor torque ripple and therefore the motor vibration are reduced by controlling the motor speed and the phase difference between the voltage developed across and the current flowing through, the winding of each of the U-, V- and W-phases. Of course, if anti-vibration rubber is used for the motor according to this invention, the effect of further suppressing noise can be enjoyed.

According to the example shown in FIGS. 30A and 30B, even in the case where the motor 5 using the motor drive apparatus embodying this invention is combined with a fan and used as a air blower, the fluctuations in speed and load can be reduced through speed and phase control, and the low noise drive of motors is effected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A synchronous motor drive apparatus comprising:
   a three-phase inverter that supplies three-phase AC power to a synchronous motor, the voltage and frequency of the AC power being variable;
   at least one position sensor that outputs a position sensor signal related to a voltage induced in each of the windings of the synchronous motor;
   a current phase detection unit that detects the phases of the currents flowing through the respective windings of the synchronous motor;
   a motor speed calculation unit that calculates a rotational speed of the synchronous motor;
   a speed control unit that outputs a first voltage adjusting component to cause the rotational speed of the motor to approach a speed command value for the motor;
   a phase control unit that outputs a second voltage adjusting component to cause the phase difference between the phase of the position sensor signal and the phase of the current flowing through the respective winding of the synchronous motor to approach a phase difference target value; and a voltage determination unit that determines the amplitudes and the phases of the output voltages of the three-phase inverter depending on the first and second voltage adjusting components, wherein the three-phase inverter is so controlled as to generate the output voltages having amplitudes and phases determined by the voltage determination unit;

wherein the current phase detection unit further includes a current polarity detection circuit that detects a polarity of each of the currents of the windings, and that outputs a current polarity signal indicating the polarity of each of the currents of the windings; and wherein the phase control unit further includes a phase difference target value setting section that sets a phase difference target value, and performs a control operation such that the phase difference between the current polarity signal and the position sensor signal approaches the phase difference target value.

2. The synchronous motor drive apparatus as claimed in claim 1, wherein the three-phase inverter includes an inverter main circuit that has three series circuits of six switching elements, wherein each series circuit includes two of the switching elements connected in series and corresponding to each of the three phases, connected between the positive and negative terminals of its DC input terminals, and also has its three-phase AC output terminals provided at the junction points between the series-connected switching elements.

3. The synchronous motor drive apparatus as claimed in claim 1, wherein said at least one position sensor is so located as to output the position sensor signal that has a predetermined phase relationship with respect to the voltage induced across a winding of the synchronous motor.

4. The synchronous motor drive apparatus as claimed in claim 1, wherein the motor speed calculation unit calculates the rotational speed of the synchronous motor based on the position sensor signal.

5. The synchronous motor drive apparatus as claimed in claim 1, further comprising:

a motor speed command reception unit that receives the speed command value for the synchronous motor.

6. The synchronous motor drive apparatus as claimed in claim 1, wherein the first voltage adjusting component is the q-axis current command value Iq* for the synchronous motor, and the second voltage adjusting component is the d-axis current command value Id* for the synchronous motor; and the voltage determination unit determines the amplitude and phase of the output voltage of the three-phase inverter depending respectively on the q-axis current command value Iq* and the d-axis current command value Id*, and the synchronous motor drive apparatus further comprises an inverter control unit that controls the three-phase inverter in such a manner that the three-phase inverter generates its output having amplitude and phase determined by the voltage determination unit.

7. The synchronous motor drive apparatus as claimed in claim 6, wherein the voltage determination unit determines the q-axis voltage command value Vq* and the d-axis voltage command value Vd* for the output voltages of the three-phase inverter depending respectively on the q-axis current command value Iq* and the d-axis current command value Id*.

8. The synchronous motor drive apparatus as claimed in claim 7, wherein the voltage determination unit determines the application voltage command value V1 representing the amplitude and phase θv of the output of the three-phase inverter depending respectively on the q-axis voltage command value Vq* and the d-axis voltage command value Vd*.

9. The synchronous motor drive apparatus as claimed in claim 1, wherein:

the phase difference target value setting section sets the phase difference target value in accordance with the rotational speed of the synchronous motor.

10. The synchronous motor drive apparatus as claimed in claim 1, further comprising;

a phase difference target value input unit that inputs the phase difference target value from outside the apparatus to the phase difference target value setting section.

11. The synchronous motor drive apparatus as claimed in claim 1, wherein the phase control unit stops its phase control procedure when the rotational speed of the synchronous motor is lower than a preset speed.

12. The synchronous motor drive apparatus as claimed in claim 1, wherein the phase control unit executes its phase control procedure when a ratio between a positive period of the current polarity signal and a negative period of the current polarity signal is in a preset range.

13. The synchronous motor drive apparatus as claimed in claim 2, wherein the current polarity detection circuit determines the polarity of the current flowing through each phase part of the windings of the motor, depending upon the voltage of the AC output terminal of the corresponding phase at the time points when the switching elements on positive and negative arms of the corresponding phase of the inverter main circuit are both turned off.

14. The synchronous motor drive apparatus as claimed in claim 2, wherein the current polarity detection circuit determines the polarity of the current flowing through each phase part of the windings of the motor, depending upon the voltage developed across the resistor connected between the switching element on the negative arm and the negative DC input terminal of the corresponding phase of the inverter main circuit, at the time point at when the switching element is turned on.

15. A synchronous motor drive apparatus comprising:

at least one position sensor that outputs a position sensor signal related to a voltage induced in each of the windings of the synchronous motor;

a first semiconductor device incorporating therein a motor speed calculation unit that calculates a rotational speed of the synchronous motor, a speed control unit that outputs a first voltage adjusting component to cause the rotational speed of the synchronous motor to approach a speed command value for the motor, a phase difference calculation unit that calculates a phase difference between a phase of the position sensor signal and a phase of the current flowing through the respective winding of the synchronous motor, a phase control unit that outputs a second voltage adjusting component to cause the phase difference between the phase of the position sensor signal and the phase of the current flowing through the respective winding of the synchronous motor to approach a phase difference target value, wherein the phase control unit further includes a phase difference target value setting section that sets the phase difference target value, said phase control unit performing a control operation such that the phase difference between a current polarity signal and the position sensor signal approaches the phase difference target value, a voltage determination unit that determines the amplitudes and phases of the output voltages of a three-phase inverter depending respectively on the first and second voltage adjusting components, and a drive signal generation unit that generates drive signals to control switching elements of the three-phase inverter so as to cause the three-phase inverter to generate the output voltages having amplitudes and phases determined by the voltage determination unit; and a second semiconductor device incorporating therein
the three-phase inverter,
a gate drive circuit for driving the switching elements of the three-phase inverter according to the drive signals, and
a current phase detection unit that detects the phases of the currents flowing through the respective windings of the synchronous motor, wherein the current phase detection unit further includes a current polarity detection circuit that detects the polarity of each of the currents of the windings and outputs the current polarity signal indicating the polarity of each of the currents.

16. The synchronous motor drive apparatus as claimed in claim 15, wherein
the first and second semiconductor devices are both incorporated in the synchronous motor.

17. The synchronous motor drive apparatus as claimed in claim 15, further comprising:
a microcomputer incorporated in the first semiconductor device that serves as the motor speed calculation unit, the speed control unit, the phase control unit, the voltage determination unit and the drive signal generation unit.

18. The synchronous motor drive apparatus as claimed in claim 1, further comprising:
a fan attached to the synchronous motor.

19. A method for driving a synchronous motor, comprising:
supplying three-phase AC power, the amplitude and frequency of which are variable, from a three-phase inverter to a synchronous motor;
outputting at least one position sensor signal related to a voltage induced in each of the windings of the synchronous motor;
detecting phases of currents flowing in the windings of the synchronous motor;
calculating a rotational speed of the synchronous motor;
outputting a first voltage adjusting component to cause the rotational speed of the synchronous motor to approach a speed command value;
setting a phase difference target value;
outputting a second voltage adjusting component to cause the phase difference between a phase of the position sensor signal and the phase of the current flowing through the respective winding of the synchronous motor to approach the phase difference target value;

determining the amplitudes and phases of output voltages of the three-phase inverter based on the first and second voltage adjusting components; and controlling the three-phase inverter in such a manner that the three-phase inverter generates the output voltages having amplitudes and phases determined by the voltage determination unit.

20. A synchronous motor drive apparatus comprising:
a three-phase inverter for supplying three-phase AC power, the voltage and frequency of which are variable, for a synchronous motor;
position sensors for outputting the position sensor signals related to the voltages induced in the windings of the synchronous motor;
a current phase detection unit for detecting the phases of the currents flowing through the respective phase windings of the synchronous motor;
a motor speed calculation unit for calculating the rotational speed of the synchronous motor;
a speed control unit for outputting a first voltage adjusting component to cause the rotational speed of the motor to approach a speed command value for the motor;
a phase control unit for outputting a second voltage adjusting component to cause the phase difference between the phase of the position sensor signal and the phase of the current flowing through the respective phase winding of the synchronous motor to approach a phase difference target value; and
a voltage determination unit for determining the amplitudes and the phases of the output voltages of the three-phase inverter depending on the first and second voltage adjusting components,
wherein the three-phase inverter is so controlled as to deliver the output voltages the amplitudes and phases of which are determined by the voltage determination unit;
wherein the phase control unit stops its phase control procedure when the rotational speed of the synchronous motor is lower than a preset speed.

21. A synchronous motor drive apparatus comprising:
a three-phase inverter for supplying three-phase AC power, the voltage and frequency of which are variable, for a synchronous motor;
position sensors for outputting the position sensor signals related to the voltages induced in the windings of the synchronous motor;
a current phase detection unit for detecting the phases of the currents flowing through the respective phase windings of the synchronous motor;
a motor speed calculation unit for calculating the rotational speed of the synchronous motor;
a speed control unit for outputting a first voltage adjusting component to cause the rotational speed of the motor to approach a speed command value for the motor;
a phase control unit for outputting a second voltage adjusting component to cause the phase difference between the phase of the position sensor signal and the phase of the current flowing through the respective phase winding of the synchronous motor to approach a phase difference target value; and
a voltage determination unit for determining the amplitudes and the phases of the output voltages of the three-phase inverter depending on the first and second voltage adjusting components,
wherein the three-phase inverter is so controlled as to deliver the output voltages the amplitudes and phases of which are determined by the voltage determination unit;

wherein the current phase detection unit includes a current polarity detection circuit for detecting the polarity of each of the phase currents and for outputting a current polarity signal, and the phase control unit includes a phase difference target value input section for inputting a phase difference target value and performs such a control operation that the phase difference between the current polarity signal and the position sensor signal may approach the phase difference target value; and wherein the phase control unit renews its phase control procedure while the ratio of the duration for which the current polarity signal takes a positive value to the duration for which the current polarity signal takes a negative value, remains in a preset range.

22. A synchronous motor drive apparatus comprising:

a three-phase inverter for supplying three-phase AC power, the voltage and frequency of which are variable, for a synchronous motor;

position sensors for outputting the position sensor signals related to the voltages induced in the windings of the synchronous motor;

a current phase detection unit for detecting the phases of the currents flowing through the respective phase windings of the synchronous motor;

a motor speed calculation unit for calculating the rotational speed of the synchronous motor;

a speed control unit for outputting a first voltage adjusting component to cause the rotational speed of the motor to approach a speed command value for the motor;

a phase control unit for outputting a second voltage adjusting component to cause the phase difference between the phase of the position sensor signal and the phase of the current flowing through the respective phase winding of the synchronous motor to approach a phase difference target value; and a voltage determination unit for determining the amplitudes and the phases of the output voltages of the three-phase inverter depending on the first and second voltage adjusting components, wherein the three-phase inverter is so controlled as to deliver the output voltages the amplitudes and phases of which are determined by the voltage determination unit;

wherein the three-phase inverter has three series circuits of six switching elements, each series circuit consisting of two of the switching elements connected in series and corresponding to each of the three phases, connected between the positive and negative terminals of its DC input terminals, and also has its three-phase AC output terminals provided at the junction points between the series-connected switching elements; and wherein the current polarity detection circuit determines the polarity of the current flowing through each phase part of the windings of the motor depending on the voltage developed across the resistor connected between the switching element on the negative arm and the negative DC input terminal, of the corresponding phase of the inverter main circuit at the time point at which the switching element is turned on.

23. The synchronous motor drive apparatus as claimed in claim 1, wherein the phase difference target value is set to a non-zero value.

* * * * *